US011245731B1

(12) United States Patent
Guruswamy et al.

(10) Patent No.: US 11,245,731 B1
(45) Date of Patent: Feb. 8, 2022

(54) PROTECTING WEB APPLICATIONS FROM UNTRUSTED ENDPOINTS USING REMOTE BROWSER ISOLATION

(71) Applicant: Menlo Security, Inc., Mountain View, CA (US)

(72) Inventors: Kowsik Guruswamy, Mountain View, CA (US); Stephen John Stanley Thornhill, Chalfont St. Giles (GB); Andrew Peter Edward Prince, Chippenham (GB); Joshua Frank Wharton, Reading (GB)

(73) Assignee: Menlo Security, Inc., Mountain View, CA (US)

( * ) Notice: Subject to any disclaimer, the term of this patent is extended or adjusted under 35 U.S.C. 154(b) by 0 days.

(21) Appl. No.: 17/081,941

(22) Filed: Oct. 27, 2020

Related U.S. Application Data

(60) Provisional application No. 62/992,958, filed on Mar. 21, 2020.

(51) Int. Cl.
  *H04L 29/00* (2006.01)
  *H04L 29/06* (2006.01)
  *G06F 21/60* (2013.01)
  *G06F 16/11* (2019.01)
(52) U.S. Cl.
  CPC ............ *H04L 63/20* (2013.01); *G06F 16/116* (2019.01); *G06F 21/602* (2013.01); *H04L 63/0272* (2013.01)

(58) Field of Classification Search
  CPC . H04L 29/14; H04L 29/0809; H04L 41/5025; H04L 67/2819; H04L 67/2866; H04L 67/02
  See application file for complete search history.

(56) References Cited

U.S. PATENT DOCUMENTS

| | | | |
|---|---|---|---|
| 8,429,429 B1 * | 4/2013 | Kargman | G06F 21/53 713/193 |
| 8,825,748 B2 * | 9/2014 | Sng | G06F 21/53 709/203 |
| 9,391,832 B1 * | 7/2016 | Song | H04L 67/02 |
| 9,887,970 B2 * | 2/2018 | Luff | H04L 63/166 |
| 11,005,819 B1 * | 5/2021 | Song | H04L 41/5025 |

* cited by examiner

*Primary Examiner* — Jeffrey C Pwu
*Assistant Examiner* — Helai Salehi
(74) *Attorney, Agent, or Firm* — Van Pelt, Yi & James LLP

(57) ABSTRACT

Disclosed herein are techniques for protecting web applications from untrusted endpoints using remote browser isolation. In an example scenario, a browser isolation system receives a request from a client browser executing on a client device to connect with a remote application accessible via a private network. A surrogate browser is provided to facilitate communications between the client browser and the remote application. A security policy is enforced against the communications.

25 Claims, 39 Drawing Sheets

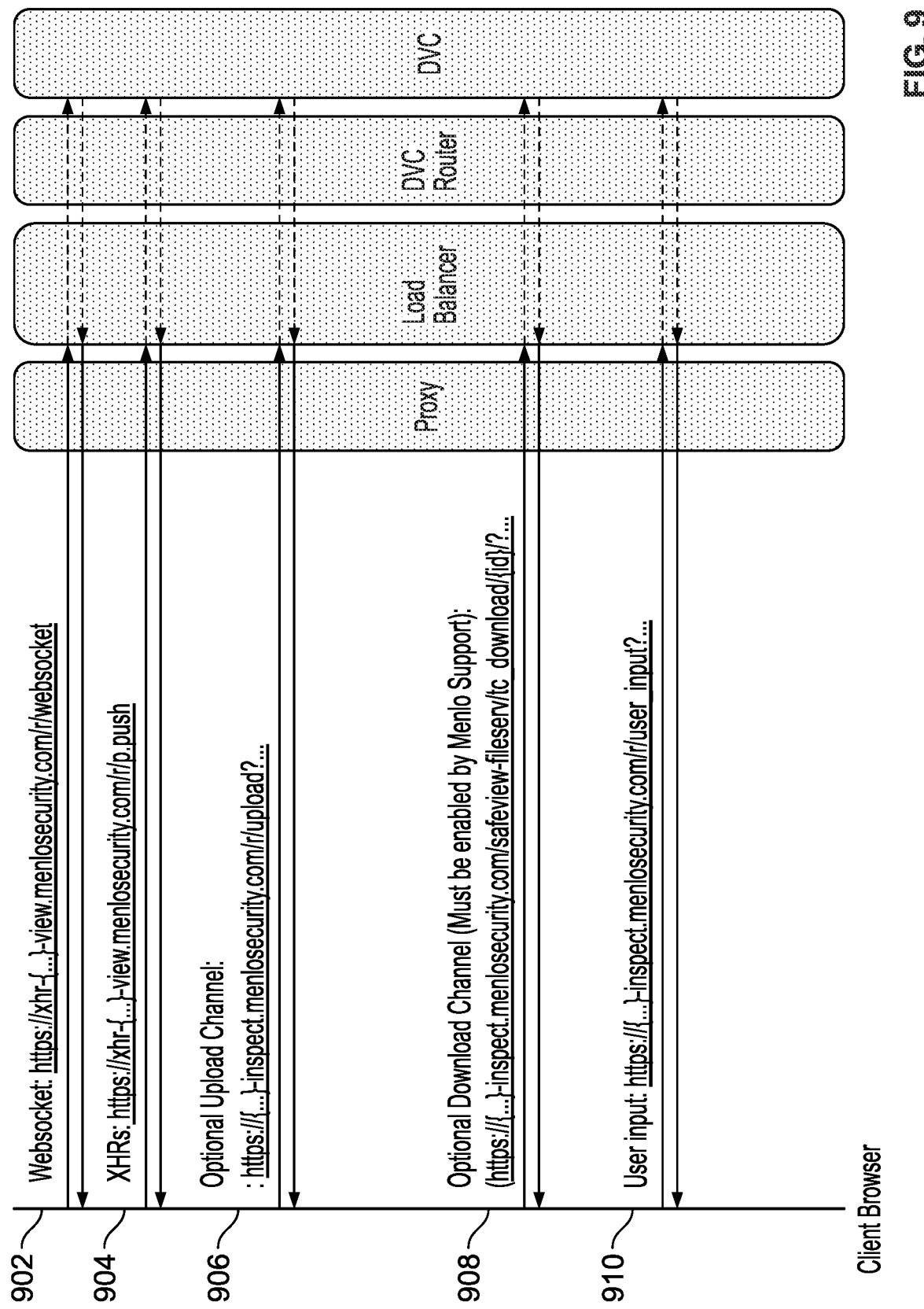

| MentoSecurity | DLP Rules | Dictionary Groups | Dictionaries | DLP Auditors | | |
|---|---|---|---|---|---|---|
| | Data Loss Prevention Rules (Drag and drop to re-order) | | | | | + Add New Rule |
| | Search | | Clear | | | 1 - 4 of 4 rules |
| | | | | | | 0 of 4 DLP Rules selected |

| | Name | Description | Users/Groups | Dictionaries | Action | | | |
|---|---|---|---|---|---|---|---|---|
| ⋮⋮ | ☐ Another PII DLP Rule | | All | Driver's licenses [USA], Bank account details with personally identifiable information [USA], Credit or debit card numbers near personally identifiable information [USA] + 2 more | ⊙ Block | Delete | Edit |
| ⋮⋮ | ☐ Job Applications | Stop uploads of employee CVs | All | Curriculum Vitae [UK], Curriculum Vitae [USA], Curriculum Vitae [Canada] | ⊙ Block | Delete | Edit |
| ⋮⋮ | ☐ PII | Block upload of personally identifiable inform... | All | Postal addresses [UK], Bank account details near contact details [UK], combination of personally identifiable information [UK] + 16 more | ⊙ Block | Delete | Edit |
| ⋮⋮ | ☐ Financial Data | | All | International Bank Account Numbers [Global], Credit card numbers - with phrases [Global], Credit card numbers [Global] + 65 more | ⊙ Block | Delete | Edit |

Sidebar:
- Dashboard
- Logs
- Insights
- Web Policy
- DLP Policy
- Reporting
- Settings
- Customization
- Help

FIG. 10

| Edit DLP Rule | | |
|---|---|---|
| DLP Rule | RULE DETAILS | |
| Content Types | Rule Name | Block CreditCard Uploads |
| Criteria | Description | Enter Description |
| Action | User Notification (Displayed on block pages) | You have attempted to submit protected corporate content to an Internet WWW site that is not approved by corporate policy |
| Dictionaries / Groups | | |

Cancel | <Back | Next> | Save

FIG. 11

Edit DLP Rule

| | |
|---|---|
| DLP Rule | |
| Content Types | USER INPUT INSPECTION |
| Criteria | User input will be passed through DLP inspection when network submissions are requested. If DLP inspection generates a policy block, the tab is blocked from network access and the user is notified. |
| Action | ◉ Inspect Text Inputs |
| Dictionaries / Groups | FILE UPLOAD INSPECTION |
| | Files being uploaded will be passed through DLP inspection. If DLP inspection generates a policy block, the upload is blocked and the user is notified. |
| | Maximum File Size [50] [MB ⌄] |
| | ◉ Inspect All File Types |

[Cancel] [< Back] [Next >] [Save]

FIG. 12

Edit DLP Rule

- DLP Rule
- Content Types
- Criteria
- Action
- Dictionaries / Groups

USERS AND GROUPS

◉ All Users

List of Users — Enter users(s)
List of Groups — [finance dept ×] [marketing dept ×]
Enter groups(s)

DOMAINS

Domains (optional) — dropbox.com dlptest.com box.com

CATEGORIES

Categories (optional) — Add Categories

[Cancel] [< Back] [Next >] [Save]

FIG. 13

Edit DLP Auditor Profile

AUDITOR DETAILS
Auditor Name    DLPAdmins
Description     DLP Admin Auditors team

AUDITORS AND FILE DETAILS
Email Addresses    bob@example.com ✕
                   charlie@example.com ✕
                   Enter Email Address(es)

Send File          ◯
File Format        Encrypted ZIP File
Encrypted ZIP Password    Generate Password Cancel  Save

FIG. 14

| Edit DLP Rule | | |
|---|---|---|
| DLP Rule | | |
| Content Types | ACTION | |
| Criteria | Action | ⊙ Block ⌄ |
| Action | Send Audit Email | ◯ |
| Dictionaries / Groups | Select Auditors | [DLPAdmins ×] Add Auditors |

Cancel  < Back  Next >  Save

FIG. 15

Edit DLP Rule

DLP Rule
Content Types
Criteria
Action
Dictionaries / Groups

DLP GROUPS / DICTIONARIES

Credit | All Types ▼ | All Categories ▼ | All Regions ▼ | Clear 13 items selected | 1-10 of 23

| Name ▲ | Type | Category | Region |
|---|---|---|---|
| Credit card magnetic track 1 [Global] | Predefined Dictionary | Financial Data, PCI DSS | Global |
| Credit card magnetic track 2 [Global] | Predefined Dictionary | Financial Data, PCI DSS | Global |
| Credit card number - with phrases [Global] | Predefined Dictionary | Personally Identifiable Information, Financial Data, PCI DSS | Global |
| Credit card numbers [Global] | Predefined Dictionary | Personally Identifiable Information, Financial Data, PCI DSS | Global |
| Credit or debit card numbers near personally identifi... | Predefined Dictionary | Personally Identifiable Information, Financial Data, PCI DSS | Belgium |
| Credit or debit card numbers near personally identifi... | Predefined Dictionary | Personally Identifiable Information, Financial Data, PCI DSS | Finland |
| Credit or debit card numbers near personally identifi... | Predefined Dictionary | Personally Identifiable Information, Financial Data, PCI DSS | Hong Kong |
| Credit or debit card numbers near personally identifi... | Predefined Dictionary | Personally Identifiable Information, Financial Data, PCI DSS | India |
| Credit or debit card numbers near personally identifi... | Predefined Dictionary | Personally Identifiable Information, Financial Data, PCI DSS | Singapore |

Cancel | < Back | Next > | Save

Menlo Security

Password Required
Name: Test Credit Card Account Numbers Encrypted.docx
Destination: dlpest.com This file must be inspected before uploading but is encrypted. Please input password.

[ ******** ]  [ Submit ]

Private Access > Application Catalog

Application Catalog  View User Portal
Catalog of applications available via private access 2602 — + Add Rule

| LOGO | APPLICATION NAME | DESCRIPTION | |
|---|---|---|---|
| Bitbucket | Bitbucket | Version control repository hosting s... | |
| Confluence | Confluence | Collaboration software program | |
| Jenkins | Jenkins | Free and open source automation s... | |
| Jira Software | JIRA | Agile software development | |
| Knowledgebase | Knowledge Base | Internal knowledge base tool | |
| ACME Timecard | ACME Timecard | ACME Bank internal timecard | |
| Retool | Retool | Build internal tools and connect to ... | |
| Wiki.js | Wiki.js | Internal wiki documentation | |

FIG. 26

Private Access

← Edit Application Configuration Attributes  [Save]

Application Details
Logo
[◆ Jira Software]
Replace

Name: JIRA

Description (optional): Agile software development

Application Domains
Hostnames under which this application is accessed (top-level address bar names. Resource domains not required)

[IP, IP Range or CIDR block]
[+Add]  Import List

ADDRESSES
- jira.acmebank.com
- jira.acmebankinfra.com
- jiratest.acmebank.com

DNS Servers
DNS Server IP addresses, must serve intranet DNS required for access to the application.

Preferred DNS Server: 192.168.22.16
Alternate DNS Server (optional): 192.168.22.17

Application Connector
Registered application connectors which have been deployed and connected to Menlo VPN for the application to be accessed through.

[My_Connector ▼]

Network Policy
Firewall policy controls limiting access to corporate network, enforced at the VPN egress.
◯ Allow DNS access to configured servers

FIG. 27

Private Access

Private Access > User Application Rules

Private Access Rules
Define users/groups access to authorized applications

All Modes ▸ 🔍 Search

| # | NAME | SOURCE | APPLICATION DESTINATION | USERS/GROUPS | ACCESS MODE | |
|---|---|---|---|---|---|---|
| 1 | Jenkins | 10.12.2.2 | Jenkins | todd@menlosecurity.com | Read Only | |
| 2 | Atlassian | Any | 3 Applications | Any | Read / Write | |
| 3 | MKT Analytics | 2 Addresses | 2 Applications | 2 Users | Read / Write | 2802 |

+ Add Rule

FIG. 28

≡ ♀ Private Access ⬛ 🔍 Search  ⓘ ⓘ ⓘ

← Edit Private Access Rule  [Save]

Rule Details  ⌃
Name
Atlassian
Description (optional)
Atlassian Apps (Confluence, Jira, and Bitbucket)  ← 2902

Source  ⌃
Please enter the source addresses: Individual IPs (e.g. 35.8.2.41/32). IP Ranges (e.g. 35.8.1.100-35.8.3.99) and/or CIDR Blocks (e.g. 35.8.0.0/16)
⊂⊃ Any Source   ← 2904

Application Destination  ⌃
Select one or more applications.
Supported Applications (5)   Selected Applications (3)
Jenkins                       Bitbucket
Knowledge Base      »»        Confluence
ACME Timecard        »        JIRA
Retool               ‹
Wiki JS             ««        ← 2906

Users / Groups  ⌃
Apply this rule to all users and groups or limit the rule to a particular user, group or both
⊂⊃ All users / groups   ← 2908

Access Profile / Mode  ⌃
Isolate Mode
[Read / Write] [Read Only]
⊂⊃ Allow Downloads
⊂⊃ Allow Uploads

Reasons and Tags OPTIONAL  ⌃
You can insert reasons and tags onto the rule. The reason can be any free form text you want (limited to 200 characters). Tags are short names (limited to 20 characters) you can use to associate this rule for sorting and filtering
Reason                  Notes
Employee Remote Access  Regular access rule
Tags
(bitbucket ⊗)  (Confluence ⊗)  (JIRA ⊗)

◈ Jira Software | Dashboards ˅ Projects ˅ Issues ˅ Boards ˅ Create | Search 🔍 🖉 ⊘ ⊗

Copy of Copy of Service Del... ˅
▤ Backlog
▦ Active sprints
⚓ Releases
⌕ Reports
▣ Issues
⚙ Components PROJECT SHORTCUTS
Release Schedule
Active Releases and Branches Context menu by right-click is not correctly shown in Activemail 🖉 Edit | ◌ Comment | Assign | More ˅ | Cherry Pick | Security Issue | Workflow ˅ | ˅ | 🗎 Export ˅

˅ Details
Type: ☑ Task
Priority: ■ Medium
Affects Version/s: 2.65.0
Component/s: None
Labels: jira escalated
Issue Source: Customer
SR Number:
Issue Characteristics:
Sprint: Safeview 2019-10B
Browsers Tested: Chrome, IE, Firefox, Edge
Browsers Affected: Chrome, IE, Firefox, Edge
Verified In: 2.64.0, 2.65.0
Deploy Type: Cloud
Customer:
Problem Categorization: context-menu-list Status: RESOLVED (View Workflow)
Resolution: Fixed
Fix Version/s: 2.64.0, 2.65.0

˅ People
Assignee: Yang
Assign to me
Reporter: Kimura
Votes: 0 Vote for this issue
Watchers: 3 Start watching this issue ˅ Dates
Created: 18/Oct/19 12:50 AM
Updated: 18/Oct/19 12:21 PM
Resolved: 18/Oct/19 12:21 PM ˅ Zendesk Support
⟳ Loading add-on Zendesk Support for JIRA.

˅ Development
3 Commits                Latest 14/Oct/19

˅ Description
PoC customer        raised the issue that context menu by right-click is not correctly shown in Activemail.

˅ Attachments
📎 Drop files to attach, or browse.

> ▦ Activemail native access expected behavior.zip   18/Oct/19 12:47 AM
                                                      1.83 MB
> ▦ Activemail reproduced in isolation.zip            18/Oct/19 12:48 AM
                                                      5.94 MB

PROTECTING WEB APPLICATIONS FROM UNTRUSTED ENDPOINTS USING REMOTE BROWSER ISOLATION

CROSS REFERENCE TO OTHER APPLICATIONS

This application claims priority to U.S. Provisional Patent Application No. 62/992,958 entitled MANAGING CONTENT UPLOADS filed Mar. 21, 2020 which is incorporated herein by reference for all purposes.

BACKGROUND OF THE INVENTION

Entities such as enterprises typically host a set of internal applications (e.g., database applications, development tools, etc.) for internal use. To limit access to such applications (e.g., to employees/contractors affiliated with the enterprise), a typical approach is to make such applications accessible only from an IP address associated with the enterprise. In order to allow for remote work (or other reasons), virtual private networks (VPNs) are often used. Unfortunately, such use of VPNs can be problematic. For example, configuring and deploying hardened endpoint systems with VPN access can be expensive and time consuming. And, if the endpoint executing the VPN client software is compromised (or the user of the endpoint is untrustworthy), providing direct access to the application stack (and any vulnerabilities) can pose a significant security risk. Another problem is that user experience can often degrade when using a VPN (e.g., due to increased overhead on the client device, onerous key management requirements, etc.). Accordingly, improvements in providing access to internal applications are desirable.

BRIEF DESCRIPTION OF THE DRAWINGS

Various embodiments of the invention are disclosed in the following detailed description and the accompanying drawings.

FIG. 9 illustrates different communication channels used in various embodiments.

FIG. 10 illustrates an example of an interface.
FIG. 11 illustrates an example of an interface.
FIG. 12 illustrates an example of an interface.
FIG. 13 illustrates an example of an interface.
FIG. 14 illustrates an example of an interface.
FIG. 15 illustrates an example of an interface.
FIG. 16 illustrates an example of an interface.
FIG. 20 illustrates an example of an interface.
FIG. 26 illustrates an embodiment of an application catalog.
FIG. 27 illustrates an embodiment of an application catalog edit interface.
FIG. 28 illustrates an embodiment of an access rule configuration interface.
FIG. 29 illustrates an embodiment of an access rule configuration interface.
FIG. 31 illustrates an example of a Jira web interface.
FIGS. 32A and 32B illustrate examples of a file download interface.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Example Environment

Figure 1:
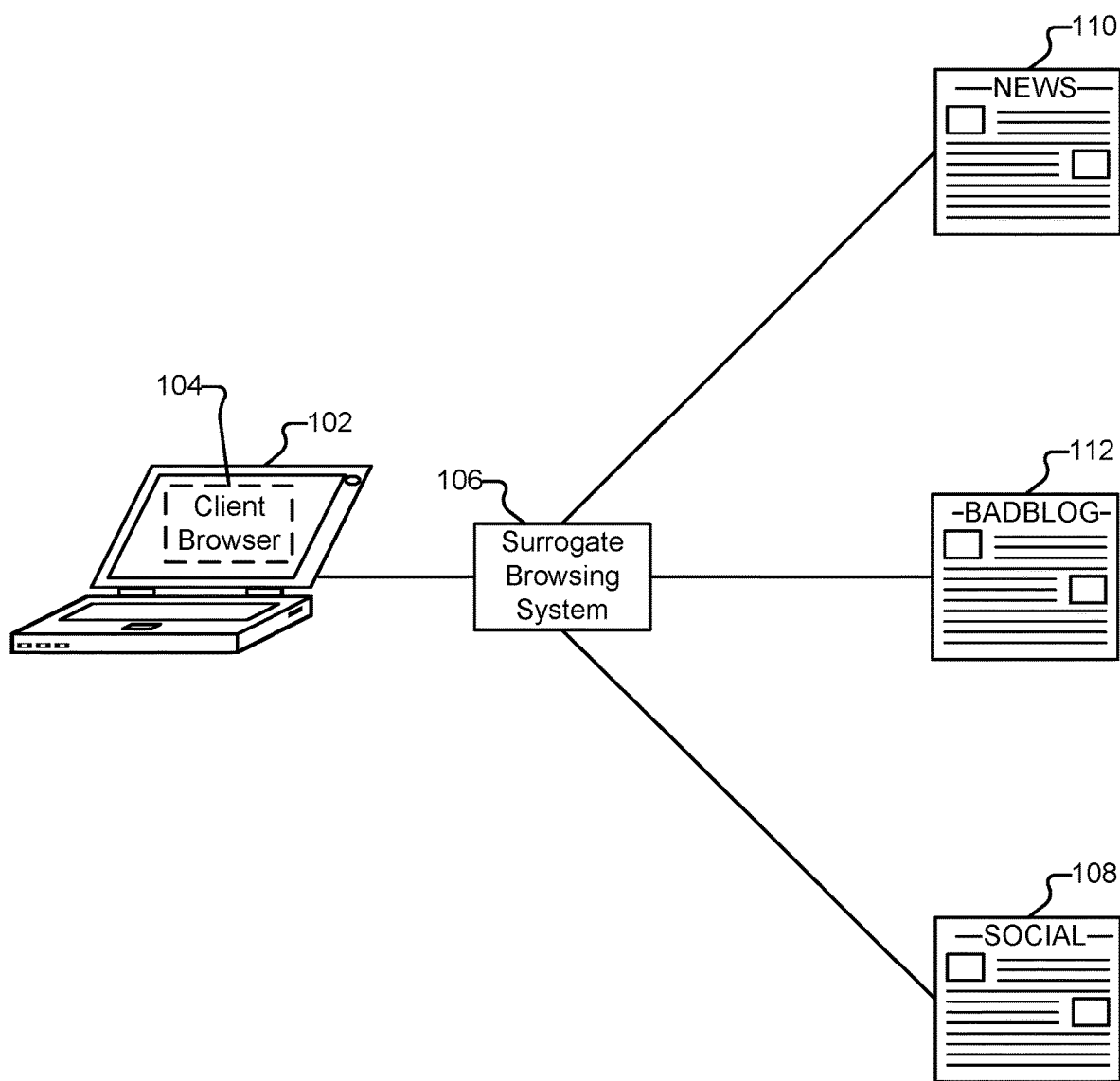
FIG. 1 illustrates an embodiment of an environment in which surrogate browsing services (also referred to herein as isolated browsing services) are provided.

FIG. 1 illustrates an embodiment of an environment in which surrogate browsing services (also referred to herein as isolated browsing services) are provided. In the example shown, client device 102 (e.g., a laptop computer) is executing a client browser application 104. Embodiments of the techniques described herein are applicable to a variety of client devices and browser applications. For example, desktop computers, tablet devices, smartphones, game consoles, and set top boxes are all examples of client devices. Client browser 104 can similarly be one of a variety of browsers, including: a legacy browser (e.g., that is no longer supported/maintained); a browser for a mobile device such as a phone or tablet; a modern browser that is not current on its patches/updates; and/or a modern browser whose patches are up-to-date.

Suppose a user of client 102 (hereinafter referred to as "Alice") has an account on social networking website 108. Via site 108, Alice learns about news articles that are of interest to her friends. For example, Alice's friend, Bob, might include in his profile on site 108 a link to a news article about a solar eclipse. The news article is located on news website 110. While website 110 is legitimate, suppose it has unfortunately been compromised and is perpetrating drive-by download attacks. If Alice were to visit website 110 directly using client browser 104, Alice's browser would quickly be compromised. If, instead, Alice used the services of surrogate browsing system 106, Alice's browser would be protected. As will be described in more detail below, in various embodiments, surrogate browsing system 106 provides protection to browsers such as browser 104 by obtaining and rendering content on behalf of users, and then transmitting a representation of that content on to the client browser.

The surrogate browser can perform all dynamic rendering of a page, including potentially dangerous JavaScript. As will be described in more detail below, in some embodiments, after the page has been rendered by the surrogate, a transcoding engine transcodes the page layout of the rendered page in the surrogate browser and sends it to the client in the form of layout updates, canonicalized Cascading Style Sheets (CSS), and/or canonicalized images or other resources. Third party JavaScript and/or plugins, and malformed images/CSS are not sent to the client. Users, such as Alice, can interact with the representations, such as by clicking on links—resulting in safe and enjoyable user experiences.

System 106 is illustrated as a single logical device in FIG. 1. As will be described in more detail below, in various embodiments, system 106 is a scalable, elastic architecture and can comprise several distributed components, including components provided by one or more third parties. Further, when system 106 is referred to herein as performing a task, such as transmitting or processing data, it is to be understood that a sub-component or multiple sub-components of system 106 (whether individually or in cooperation with third party components) may cooperate to perform that task. As one example, system 106 can comprise a single (or multiple) Amazon EC2 instances. Such instances can be geographically distributed—located at data centers around the world.

Figure 2A:
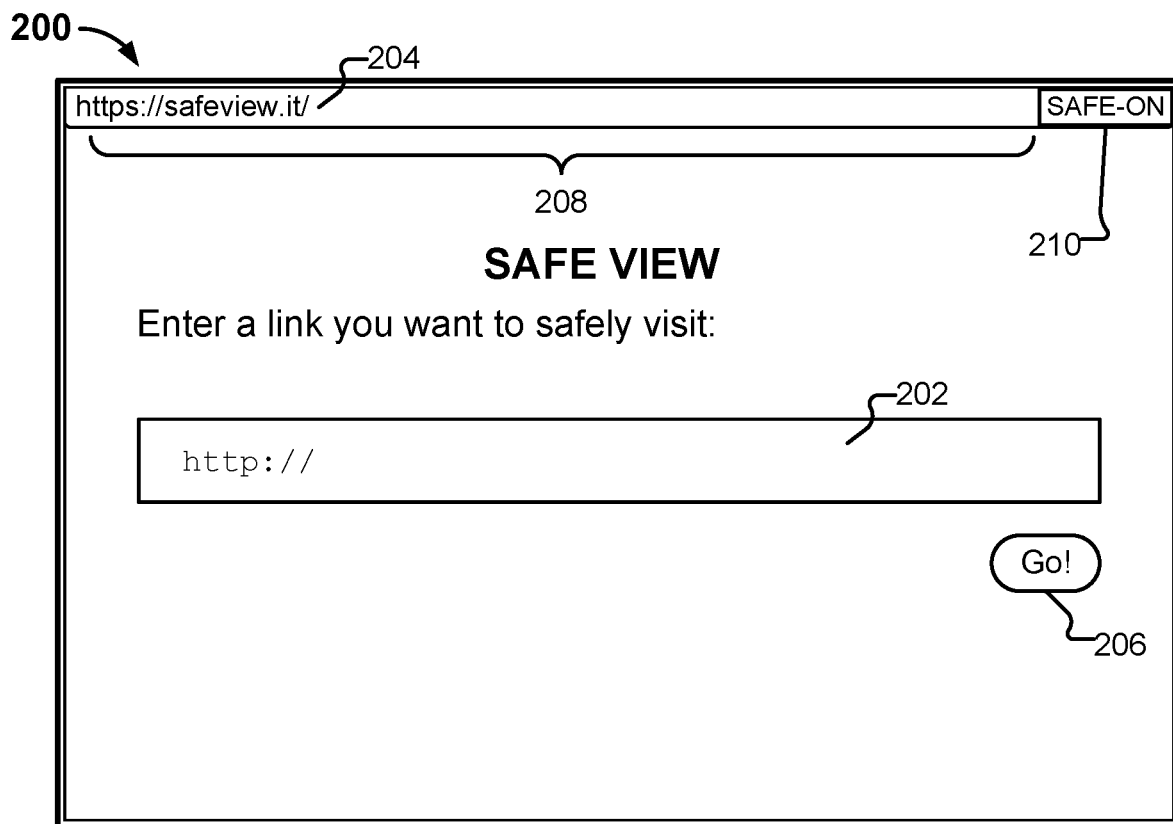
FIG. 2A illustrates an embodiment of an interface as rendered in a browser.

Depicted in FIG. 2A is one example way that Alice can avail herself of the surrogate browsing services of system 106. In particular, FIG. 2A illustrates an embodiment of an interface as rendered in a browser. As shown, Alice has navigated to page 204 using her browser 104. Interface 200 is a web page served by system 106. Alice enters the URL of the page she wishes to securely visit (e.g., http://example-news.com/solareclipse.html) by typing the URL into box 202 and selecting button 206. The services of system 106 can also be accessed in a variety of other ways. For example:

Alice can manually prepend the URL of the page she wishes to securely visit (examplenews.com/solareclipse.html) with a URL associated with system 106 (e.g., https://safeview.it) in URL bar 208. An example of such a composite URL is depicted at 252 in FIG. 2B.

A browser plugin installed on client browser 104, and/or native functionality of client browser 104, as applicable, can be configured to cause Alice's request for site 110 to be directed through system 106. As one example, a toggle button 210 can be included in the browser that allows Alice to toggle whether all (or none) of her web browsing is routed through system 106. As another example, a context menu can be added so that when Alice right-clicks a link (or otherwise activates the context menu), she can select a "view this link safely" option that opens the link using the services of system 106. As yet another example, browser 104 can be configured so that whenever it is launched by Alice's email client (e.g., because Alice has clicked on a link in an email), browsing traffic is routed through system 106. As yet another example, Alice (or another appropriate entity) can specify a whitelist of sites for which the processing of system 106 is not needed/desired (e.g., Alice's banking website) and have all web browsing activity outside of sites included on the whitelist processed by system 106.

The services of system 106 can be integrated into site 108 in a variety of ways. For example, site 108 can be configured to display a "view this link safely" button next to links that are not included in a whitelist of sites (e.g., the top 200 Internet domains). The button can also be made available next to all links—not just those that appear on a whitelist.

System 106 can also provide a URL shortening service (e.g., to site 108) in which all URLs posted by users to site 108 (e.g., http://examplenews.com/solareclipse.html) are replaced with URLs that direct requests through system 106. An example of such a shortened URL is https://safeview.it/7x83dh37. In some embodiments, only some URLs posted to site 108 are shortened (or otherwise changed to system 106 links). For example, site 108 (or another appropriate entity) can maintain a whitelist of sites for which a user is allowed to directly access via links uploaded to site 108. For any other link appearing on site 108 (and/or for links that are determined to be suspicious), the URL shortening service is used. One example of a malicious site is site 112, a blog that hosts pictures of kittens in the hopes of attracting visitors to download malicious applications under the guise of such downloads being kitten-oriented screen savers.

Anti-phishing and other browsing protection software can be integrated with services provided by system 106. For example, instead of blocking a user's access to a suspicious site, or merely warning the user that the site she is about to visit could be malicious, attempts by a user to access suspicious pages can be routed through system 106. In that way, the user can both satisfy her desire to visit the suspicious site and avoid compromising her computer.

System 106 can also be configured to provide protection services by operating in an enterprise mode, described in more detail below. In some embodiments, when running in enterprise mode, system 106 is collocated with other infrastructure of the enterprise, such as by being on premise with the clients that use the system. In other embodiments, the system uses third party services, such as Amazon EC2.

Figure 2B:
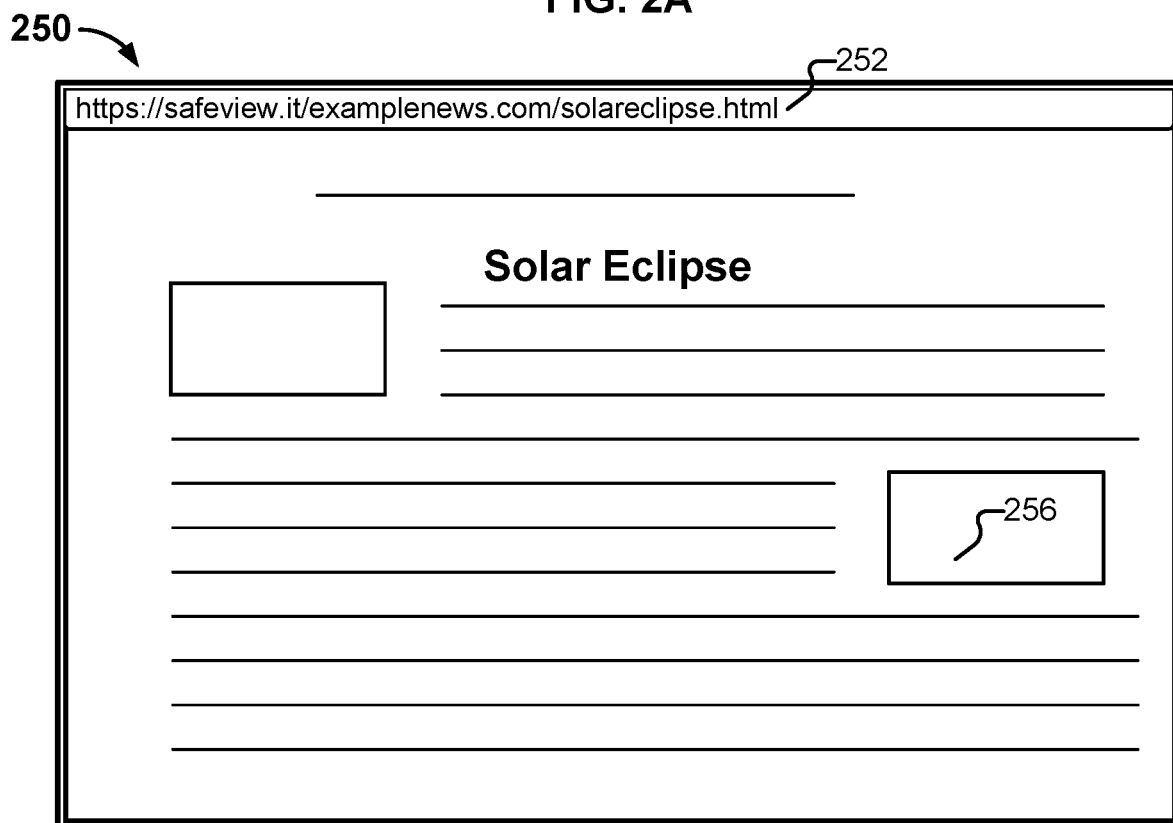
FIG. 2B illustrates an embodiment of an interface as rendered in a browser.

FIG. 2B depicts interface 200 after Alice has typed (or copy and pasted) the URL "examplenews.com/solareclipse.html" into box 202 and pressed button 206. In some embodiments, the content displayed in interface 250 appears, to Alice, to be identical to the content that would have been shown to her if she had visited the page "examplenews.com/solareclipse.html" directly with her browser. As will be described in more detail below, system 106 has fetched the content from site 110 on behalf of Alice, and has processed the received content to generate a representation of the content that is then provided by system 106 to client 102. Also, as will be described in more detail below, surrogate browsing system 106 can be configured in a variety of ways and use a variety of techniques to transform the content it receives (e.g., from site 110) prior to transmitting a representation of the content to client 102.

Figure 3:
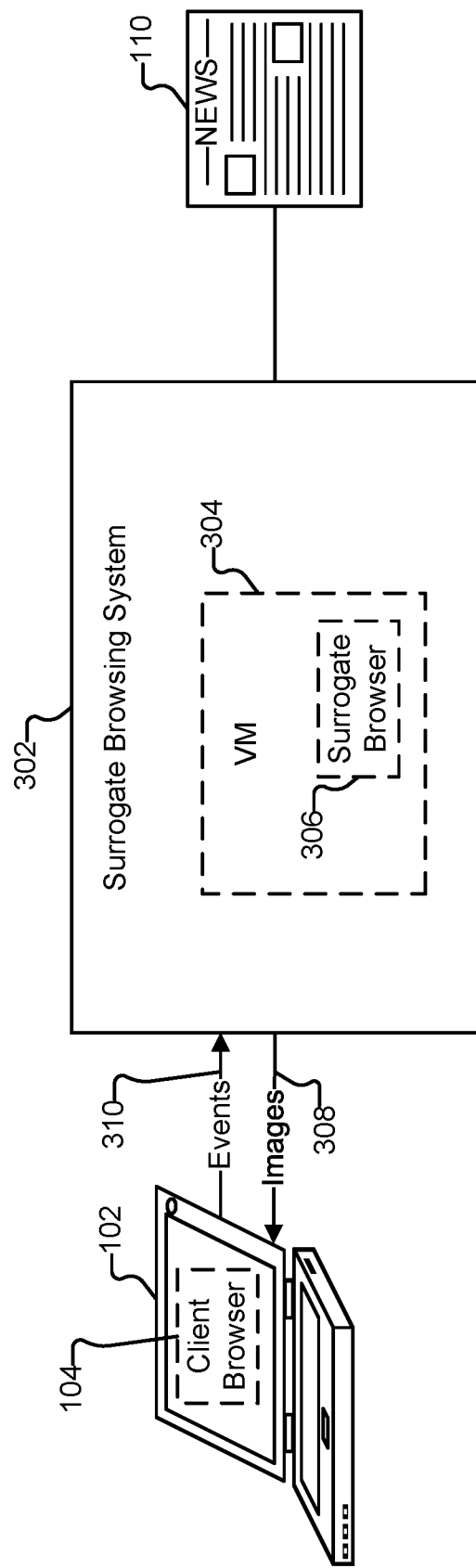
FIG. 3 illustrates an embodiment of a surrogate browsing system.

FIG. 3 illustrates an embodiment of a surrogate browsing system. Surrogate browsing system 302 is one embodiment of surrogate browsing system 106. When Alice connects to system 302, her client browser 104 receives JavaScript that facilitates communication with system 302 via the remote framebuffer (RFB) protocol. As one example, the JavaScript can implement a Virtual Network Computing (VNC) client. Other graphical desktop sharing technologies can also be used in conjunction with the techniques described herein, as applicable.

In the example shown in FIG. 3, when Alice requests access to a page on site 110 (e.g., by clicking submit button 206), a virtual machine 304, in which a surrogate browser application 306 is executing, is made available to browser 104. An image of the page is sent by surrogate browsing system 302 to client 102 (308). In some embodiments, the image sent to Alice is transcoded so that, for example, an attacker cannot send malicious pixels to Alice. When Alice interacts with the image via her browser 104, her events, such as mouse clicks and keyboard presses, are observed and transmitted by the JavaScript executing on client 102 to virtual machine 304 (310). System 302 interprets the received events (e.g., by overlaying the position of the events on Alice's rendering of the page on top of the page as seen by system 302) and surrogate browser 306 takes the corresponding actions with respect to site 110, if applicable. For example, if Alice attempts to click a link on the page she is viewing, her click event is sent to system 302 and browser 306 replicates Alice's click on site 110. If Alice is randomly clicking in white space, in some embodiments, the event is not replicated to site 110. As browser 306's view of the page changes (e.g., a new page is displayed due to following a link), updated images are streamed to Alice's browser 104.

The surrogate browsing approach depicted in FIG. 3 will protect Alice's computer 102 against attacks, such as drive-by downloads and zero-day exploits, that may be present on site 110. Further, with respect to certain websites (e.g., ones with relatively simple layouts), Alice may be unable to distinguish between the experience of accessing the site directly with her browser, or accessing the site using surrogate browsing system 302. The approach shown in FIG. 3 can also be used to allow Alice to safely use certain types of browser plugins (on the surrogate browser) such as Flash.

Interaction with some sites, however, using system 302, may be too slow or otherwise less enjoyable for Alice. Other surrogate browsing approaches can also be used, and in particular, will provide good performance even when used in conjunction with more sophisticated sites (e.g., sites with interactive games, and/or which require context such as the position of scroll bars, look of widgetry, and size of internal frames).

As will be described in conjunction with FIG. 4, one alternate surrogate browsing approach is to render a page in a surrogate browser and transcode the layout of the rendered page in a secure manner before sending it to the client browser. One example of such transcoding is to have a dynamic transcoder encode the Document Object Model (DOM) layout of the rendered page and send DOM updates that describe the DOM of the page using a DOM update command language to the thin client layer of the client browser. The dynamic transcoder can also transcode resources such as images and CSS files into sanitized, canonicalized versions for clients to download. In particular, the dynamic transcoding involves the use of two components—a DOM transcoder, and a resource transcoder for transcoding images and CSS. The output of both components passes through a checker proxy that validates the data against a security policy before sending it to the client. A command interpreter running in the client browser interprets the DOM update commands and updates the DOM in the client browser accordingly.

Figure 4:
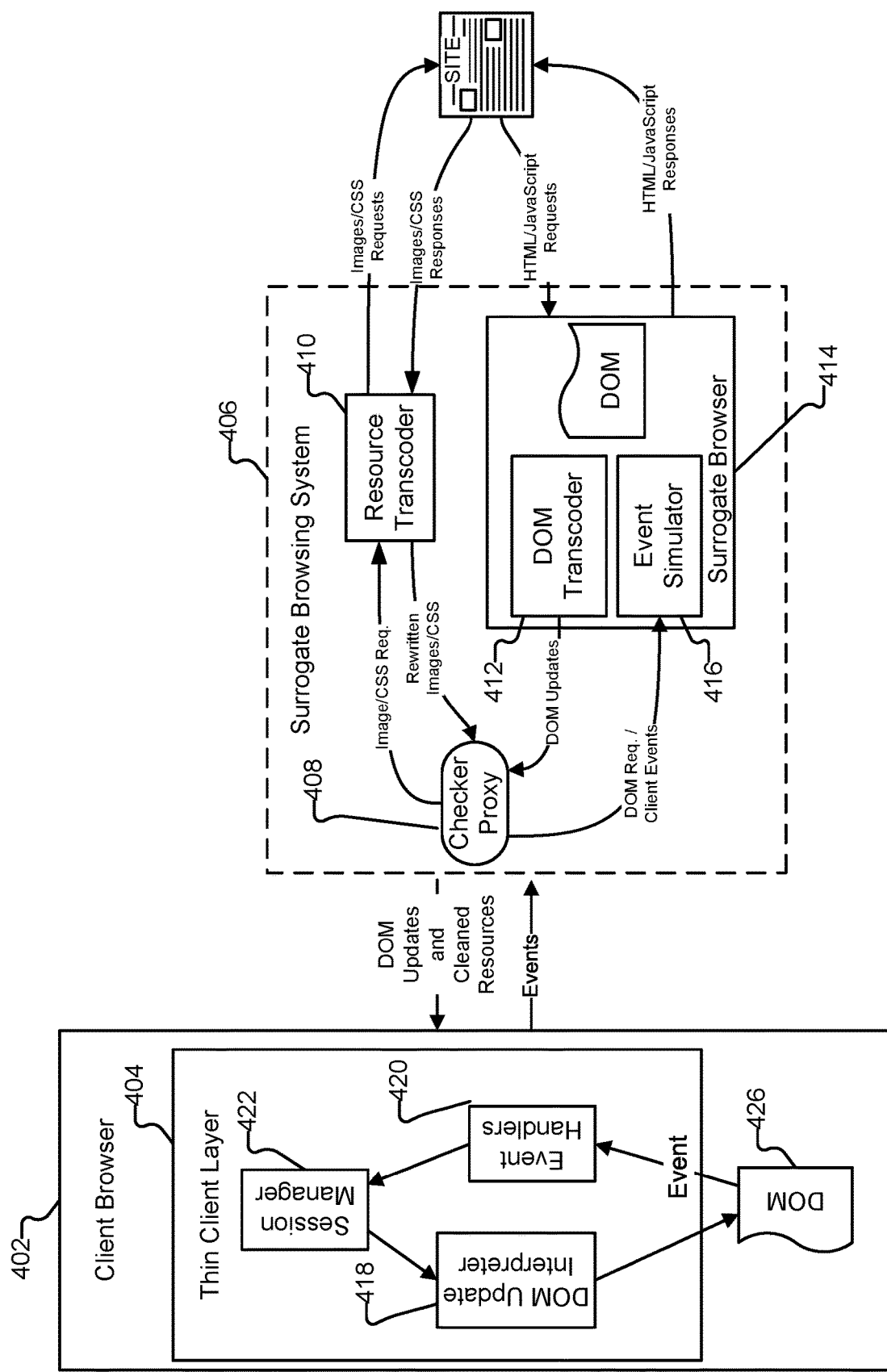
FIG. 4 illustrates an embodiment of a surrogate browsing system.

FIG. 4 illustrates an embodiment of a surrogate browsing system. Surrogate browsing system 406 is one embodiment of surrogate browsing system 106. Client browser 402 is one embodiment of client browser 104. As shown, an unmodified (i.e., stock) browser 402 is executing a thin client layer 404, which is discussed in more detail below. Among other components, system 406 includes a checker proxy 408, a resource transcoder 410, and a surrogate browser 414 that includes a DOM transcoder 412 and an event simulator 416. As explained above, system 406 can comprise scalable, elastic hardware, and can comprise several distributed components including ones provided by one or more third parties. In the example shown, system 406 uses the Amazon Elastic Compute Cloud (Amazon EC2) infrastructure.

When a client initiates a browsing session with system 406, system 406 sends a thin client layer 404 (e.g., signed JavaScript) to the client browser (e.g., 402) that decodes and interprets layout updates, images, and CSS from the surrogate browser. It also intercepts user events and forwards them to the surrogate browser. No client-side installation (e.g., of an agent) is needed. Maintenance is performed on the server-side (e.g., on system 106) and any needed updates can be pushed as new JavaScript to client 102. In some embodiments, thin client layer 404 is also configured to use the techniques described in conjunction with FIG. 3, where needed, such as if Alice navigates to a page that requires the use of a Flash plugin or includes the <canvas> tag.

Requests from client browser 402 for system 406 are received by a reverse proxy which routes the requests based on type. If the client is asking for a new page (e.g., because Alice has just clicked button 206), system 406 selects a new surrogate browser to provide surrogate browsing services to the client. In some embodiments, a load balancer is used to help determine which virtual machine should be assigned. A given virtual machine image can support many surrogate browsers. In turn, a given hardware node can support many virtual machines. If the request implicates an existing session (e.g., Alice has hit the "reload" button), the reverse proxy routes the handling of the request to the previously-used surrogate browser.

In some embodiments, one surrogate browser is assigned for a given client, per tab, per domain. Each surrogate browser is sandboxed to provide isolation between surrogate browsers (e.g., using a Linux Container). Thus, for example, if Alice has open two tabs in browser 402 (e.g., one to site 110 and one to site 112), two different surrogate browsers will provide services to her. If Alice navigates away from one of the sites (e.g., navigates from site 110 to site 108), the surrogate browser providing Alice services with respect to site 110 will go away, and a fresh surrogate browser will provide services with respect to site 108. Other configurations are also possible. For example, Alice could be assigned a single surrogate browser per session, a surrogate browser per tab (irrespective of which sites she visits in the tab), a surrogate browser per site (irrespective of the number of tabs she has open to that site), etc. Embodiments of individual components of the environment shown in FIG. 4 will now be described.

A. Surrogate Browsing System 406

1. Surrogate Browser 414

Surrogate browser 414 is a Webkit-based browser (or other appropriate browser) running inside a Linux container—a lightweight and disposable sandboxing environment. The surrogate browser renders requested pages and runs JavaScript code within the pages. It also contains an event simulator component 416 that applies user interaction events (e.g., 310) received from client 102.

2. DOM Transcoder 412

The surrogate browser also includes a DOM Transcoder component 412. As described in more detail below, client browser 402 handles DOM updates from surrogate browser 414. The surrogate browser intercepts all DOM mutation events and translates those events using the DOM transfer command language before transmitting them through checker proxy 408 to client browser 402. Surrogate browser 414 detects DOM updates by installing JavaScript DOM update handlers in the surrogate page. One way to do this is to customize Webkit to support all types of DOM mutation events and to generate the events during the initial construction of the DOM. When generating DOM commands to send to client 102, surrogate browser 414 first passes them through a whitelist that removes, among other things, all JavaScript. It also rewrites all URLs to point to through system 106. The <iframe> tag is treated specially: no source URL is sent to client 102. This allows thin client layer 404 to render content from multiple origins without violating a same-origin policy. Surrogate browser 414 enforces the same-origin policy, but handles all interactions and updates for the iframe as for a normal top-level document, with the exception that updates are directed to the top level page in the client browser. Since no JavaScript reaches client browser 402, and all external resources are passed through system 406, it is not possible for a site to convince client browser 402 to implicitly violate the same-origin policy without first compromising surrogate browser 414 and checker proxy 408.

3. Resource Transcoder 410

The techniques described herein can be used to allow a user, such as Alice, to view web pages that include such features as images and CSS, without being subject to compromise. In various embodiments, system 106 is configured to serve a canonicalized copy of such resources instead of the original ones (or, instead of preventing them from being displayed at all). In the example shown, the rewriting of images and CSS is performed by resource transcoder 410. In particular, surrogate browsing system 406 rewrites the URLs of external images and CSS to redirect client browser resource requests to resource transcoder 410, which then serves the client a cached and harmless copy of the resource. Surrogate browsing system 406 handles inline images and CSS by forwarding the inline resources to resource transcoder 410 and then substituting them with the ones returned by the transcoder.

As one example, transcoder 410 can transcode images by reading in the file from an input file descriptor and parsing the image from its original format. It then adds cryptographic random noise to the lower-order bits of the pixel data and rewrites the image to its original format, stripping unneeded metadata which can be used as attack vectors. Checker proxy 408, described in more detail below, can cryptographically verify that the noise was added before sending the image data to the client. Other media types can similarly be processed. For example, audio and video files can have noise randomly inserted to reduce the likelihood of an embedded attack payload. Other transformations can also be made and need not rely on the use of cryptographic functions. Modifications made by resource transcoder 410 are also referred to herein as inserted modification data.

4. Checker Proxy 408

Checker proxy 408 is configured to validate that the surrogate browser is generating DOM commands and resources as expected. In some embodiments, the checker proxy runs on a separate server from the surrogate browser(s). The checker proxy proxies all calls between client browser 402 and surrogate browser 414. In some embodiments, the checking is performed by making sure that all messages the surrogate browser sends to the client conform to the command language described below.

In some embodiments, the checker first verifies that the commands are all valid JSON. It then passes each individual command through a whitelist filter for that particular command. For example, the "DOM_add_element" command has a list of valid tags and attributes. Any tags and attributes not on that list cause checker proxy 408 to reject the command and terminate the connection between the surrogate and client browsers under the assumption that the surrogate browser will only send invalid commands if it has been compromised. In the case that the checker detects an invalid command or resource, the container for that surrogate browser is cleaned and restarted.

Checker proxy 408 also validates that all URLs it sees begin with the appropriate domain (e.g., safeview.it). This validation checks attributes against a blacklist of attributes that will contain URLs. Any such attribute is verified to begin with the safeview.it (or other appropriate) domain. If it does not, the checker assumes an attack, as above.

B. Thin Client Layer 404

The thin client layer (404) includes three logical components: a DOM update interpreter 418, client event input handler(s) 420, and a session manager 422.

1. DOM Update Interpreter 418

The DOM update interpreter 418 runs inside client browser 402 and applies incoming DOM updates to the client DOM (426) which are received when dynamic DOM transcoder 412 sends the layout of a page rendered in the surrogate cloud browser as a sequence of DOM updates to the client. The interpretation of these updates ensures that the client browser page shows the latest layout as rendered in the surrogate cloud browser. JavaScript supplies a standardized DOM manipulation API which can be used to update the client DOM based on the commands system 406 sends to client 102.

In some embodiments, DOM updates are defined using an unambiguous command language serialized using JSON. The basic element in the language is a command, which is a list that represents a DOM update. The first element in the list describes the type of update to be applied; the remaining elements are parameters. For example, the following command inserts an element into the local DOM:

[DOM_add_element, type, attributes, unique_id, parent_id, sibling_id]

This command will try to insert an element with type "type" into the DOM, with respect to its parent (parent_id) and successor sibling (sibling_id). The interpreter will also set the _uid attribute to unique_id and will add the additional keys and values in attributes to the element. The other commands are similar to this example. Additional detail regarding the command language is provided below.

2. Event Handler(s) 420

Many modern web pages are interactive—user events (e.g., key presses or mouse clicks) influence the content of the web page. Event handler(s) 420 are configured to capture any events created by a user and to make them available (via the thin client layer) to the surrogate browser in a manner that is consistent with what JavaScript running in the surrogate browser page expects. In some embodiments, all events are captured by event handler 420. In other embodiments, only those events for which an event handler is registered are listened for and sent.

3. Session Manager 422

Session manager 422 handles three tasks: managing connections with surrogate browsers, such as browser 414, emulating browsing history and page navigation, and providing cookie support.

Regarding communications management: In some embodiments, the session manager uses Websockets (in browsers that support it) and falls back to long-polling otherwise. These technologies enable full-duplex communication between the client and surrogate browsers.

Regarding history and navigation: In some embodiments, system 406 employs DOM updates to provide the illusion that the user is visiting different pages—a DOM reset command clears the current DOM and makes way for DOM updates from the new page. System 406 can provide history and navigation functionality in a variety of ways. As one example, system 406 can instruct client browser 402 to modify its browser history after every navigation action. To ensure that cookie state persists across client browser sessions, system 406 mirrors surrogate cookies in the client, and employs a consistency protocol to keep the client and surrogate cookie jars synchronized. When the client browser initiates a new browsing session with system 406 and visits a domain, session manager 422 transmits the client's cookie jar to the surrogate for that domain only, and the surrogate in turn will install the cookies before loading the page.

C. Enterprise Mode

Figure 5:
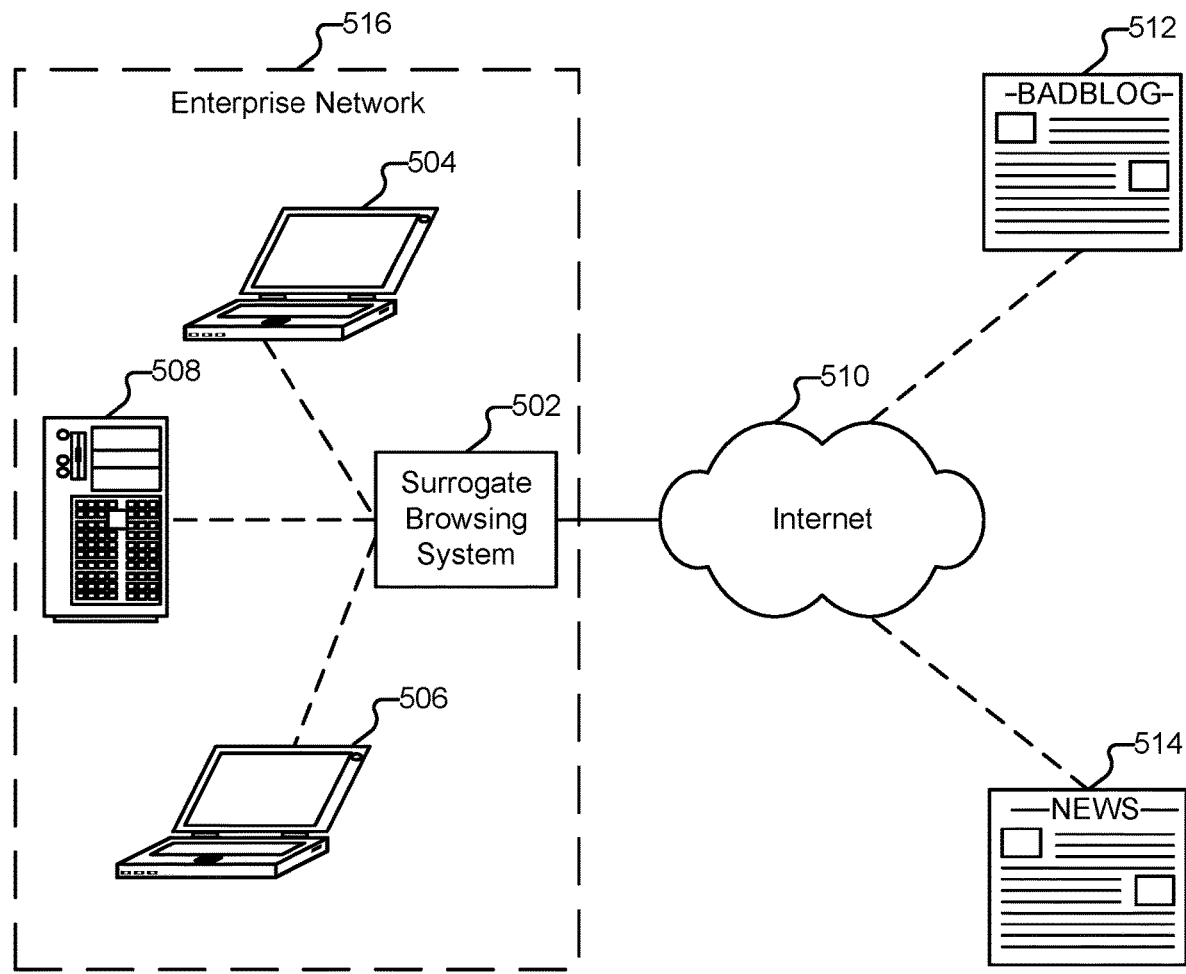
FIG. 5 illustrates an embodiment of a surrogate browsing system.

FIG. 5 illustrates an embodiment of a surrogate browsing system. In the example shown, an enterprise (e.g., the company for which a user, "Charlie," works) has deployed an embodiment of system 106 within its enterprise network 516 as an appliance. In particular, surrogate browsing system 502 is an embodiment of surrogate browsing system 106. Other entities can also use the technology described herein in enterprise mode, such as households (e.g., where a single surrogate browsing system sits at the perimeter of the home network). In the example of FIG. 5, surrogate browsing system 502 is owned by or otherwise under the control of the enterprise and comprises commodity server hardware running a server-class operating system. As one example, system 502 includes 32 GB of RAM, an 8-core AMD 4.4 GHz processor, and a Gigabit Ethernet adaptor attached to a Gigabit Ethernet network.

As shown, all web browsing traffic in network 516 destined for the Internet (510), such as traffic exchanged between client 504 and blog 512, automatically passes through surrogate browsing system 502. Other appliances may also process such traffic as applicable, such as firewall devices, and are not pictured. In some embodiments, the functionality of system 502 is incorporated into another such device, such as a firewall device.

The settings of system 502 are configurable. For example, instead of diverting all web browsing traffic through system 502, certain sites appearing on whitelists (e.g., site 514) may be accessible directly by clients 504-508, while attempts to browse suspicious sites, such as site 512, must be handled via system 502. As another example, an administrator can specify that only certain clients (e.g., client 504 and 506) must use the services of system 502, while client 508 does not. Other policies, such as whether users are alerted to the fact that their web browsing traffic is being processed by system 502 can also be configured. As yet another example, a logo, overlay, or other indicator (e.g., indicating that the browsing is being protected by system 502) can be included in the client browser.

D. Additional Information—Plugins and HTML5

Plugins such as Flash are the source of many security vulnerabilities in browsers. HTML5 includes tags such as the <canvas> tag, native audio and video support, WebGL, and other features. These tags either include new content streams that may expose vulnerabilities similar to those in images, or new JavaScript calls that must run on the client.

As mentioned above, in some embodiments, such plugins are handled by surrogate browsing system 106 by using an unoptimized VNC approach to render the graphical content directly in the browser. Certain plugins can be optimized for, such as Flash support. So, for example, video can be handled similarly to images—by transcoding the video signal and adding noise to reduce the risk of attack, and then passing the video through to our own video player, such as by using the <video> tag.

E. Additional Information—Command Language Embodiment

In some embodiments, the thin client layer uses only a small subset of the JavaScript DOM API in order to limit the attack surface. For example, the client can be configured to accept twenty commands, which together call only nine DOM API functions. The client JavaScript does not contain any other API calls, and as such is not vulnerable to these attack vectors. This is in comparison to the more than thirty DOM API calls which typical modern browsers support. The command language does not permit regular expressions.

Because all input to the client passes through checker proxy 408's whitelist, each function is called only with canonical arguments. The command language can only produce DOM trees, and it guarantees that all nodes will be unique and live. It achieves these properties by never permitting the attacker from holding a direct reference to a DOM node and by not permitting nodes to be copied or moved. All references are done through names that look up the relevant node in a dictionary. If a node needs to be moved, a new node is generated with the same attributes, and the old node is deleted. This removes two possible attack vectors: it is not possible to create circular graph structures, and deleted nodes cannot be referenced. The following is an example of a specification of a DOM command language:

The basic element in the DOM command language is a command, which is a list that represents a single DOM update. The first element in the list describes the type of update to be applied and the remaining elements are parameters. The checker proxy and the thin client layer recognize only a predefined number of command types.

TABLE 1

Part of the DOM command language specification. Unique_id and frame_id are attributes that maintain the mapping between the client and remote DOM nodes.

| Schema | Description |
| --- | --- |
| DOM_add_element, type, attributes, unique_id, parent_id, sibling_id, frame_id | Add a type element with attributes with respect to the parent and sibling. |
| DOM_remove_element, unique_id, frame_id | Remove an element. |
| DOM_modify_attribute, unique_id, attribute, value, frame_id | Set attribute value of an element to value. |
| DOM_add_cdata, type, unique_id, parent_id, value, frame_id | Add type character data value with respect to the parent. |
| DOM_change_cdata, unique_id, value, frame_id | Change character data to value. |

Table 1 includes some examples of the DOM command language specification. The number of parameters varies depending on the command type. Concrete examples are shown in Table 2.

DOM_add_element, "div," [["id," "example"], ["class," "mainCSS"]], "123121," "245564576," "12353123," "13443253456"

DOM_modify_attribute, "123121," "id," "changed," "13443253456"

DOM_remove_element, "123121," "13443253456"

Table 2: Example of DOM update sequence. A div element is added to the DOM. Then, its id attribute is changed. Finally, the element is removed from the DOM.

First, the div element is added to the DOM with respect to the parent node, the sibling node, and the frame. At the same time, its attributes id and class, defined as a list of attribute-value pairs, are updated as well. After the insertion, the element's id attribute is changed to value "changed." Finally, the element is removed from the DOM.

a) DOM_inject_script, "javascript:do_bad_things( )"
b) DOM_add_element, "script," [["type," "JavaScript"]], "123121," "245564576," "12353123," "13443253456"

Table 3: Example of unsuccessful attacks. In case a), the checker will not recognize a new command and classify it as a malicious activity. In case b), the checker will, using whitelists, observe that the attacker is trying to inject a script and classify it as an attack.

To compromise the client, the attacker needs to send a message that conforms to the DOM command language. The attacker may try to attack the thin client layer in a number of ways, for example: 1) to craft a command with a new type or 2) to use an existing command type but with bad parameters. In the first case, the attempt will fail since the checker proxy and the thin client layer only recognize a predefined set of command types. The second attack also fails in most cases, since sensitive parameters are whitelisted. Examples are shown in Table 3.

F. Example Process Used in Some Embodiments

Figure 6:
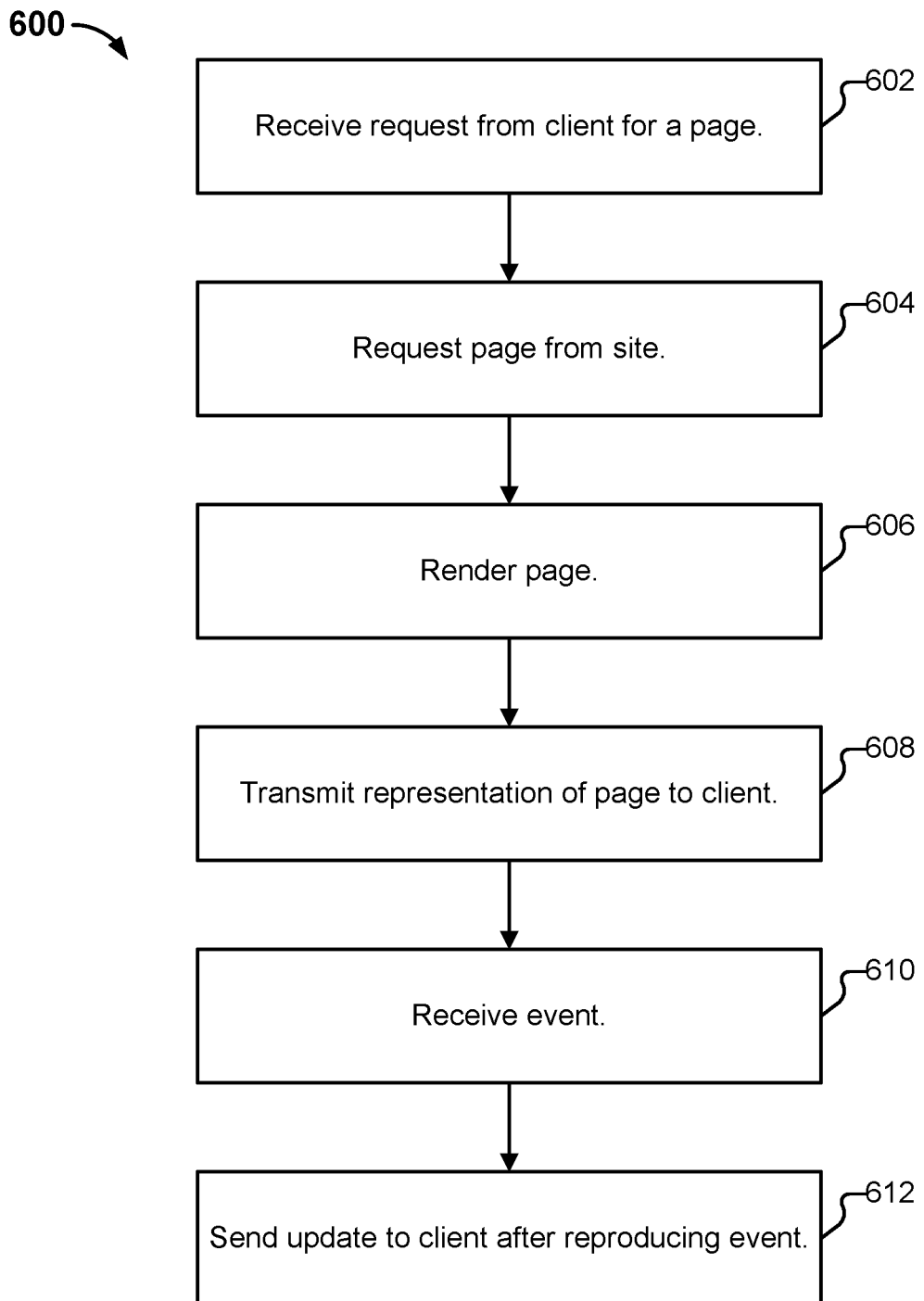
FIG. 6 illustrates an embodiment of a process for protecting a browsing session.

FIG. 6 illustrates an embodiment of a process for protecting a browsing session. In some embodiments, the process shown in FIG. 6 is performed by surrogate browsing system 106. Process 600 can also be performed by various embodiments of surrogate browsing system 106, such as system 302, system 406, and system 502, as applicable. Also, as applicable, various portions of process 600 can be repeated or omitted.

The process begins at 602 when a request from a client for a page is received. As one example, a request is received at 602 when Alice clicks on button 206 as shown in interface 200 of FIG. 2A. At 604, a page is requested from a site. As an example, system 106 requests the page, "http://example-news.com/solareclipse.html" from site 110 at 604. At 606, the requested page is rendered. As previously explained, the rendering is performed on surrogate browsing system 106.

At 608, a representation of the page is sent to the requesting client. As explained above, the page is transformed in some manner, rather than the exact web traffic being passed from the surrogate browser to the client. As one example, the representation is transmitted as an image (e.g., by system 302) at 608. As another example, the representation transmitted at 608 comprises DOM layout content.

At 610, an event is received. As one example, when Alice clicks on picture 256 of FIG. 2B, an event is sent by client 102 and received by surrogate browsing system 106 at 610. Finally, at 612, an update is sent to the client after reproducing the received event. As one example, the click event received at 610 is replicated by event simulator 416. Any resulting changes to the page as rendered in surrogate browser 414 are sent to client 102 as an update at 612—either as an updated image (e.g., in the case of system 302) or as a DOM layout update (e.g., in the case of system 406).

G. Example—Other Types of Pages

The techniques described herein can be used in conjunction with a variety of types of pages in addition to web pages (e.g., comprising HTML and resources such as images). Examples include Microsoft Word documents and documents in the Adobe Portable Document Format (PDF). As one example, an embodiment of surrogate browsing system 302 can be configured to transmit images of a Word document to client 102 (whether via browser 104 or a different application) and to receive events associated with a user's interactions with the Word document. As another example, PDF documents can be rendered in a surrogate viewer and an embodiment of system 302 can be configured to send images of the rendered PDF views to a client.

Embodiments of system 406 can similarly be configured to provide more sophisticated surrogate viewing/editing of documents, such as PDF documents. As one example, PDF documents can be rendered in a surrogate viewer, their internal structures obtained, and encoded prior to sending to a client (e.g., by an embodiment of system 406).

II. Additional Example Environment

Figure 7:
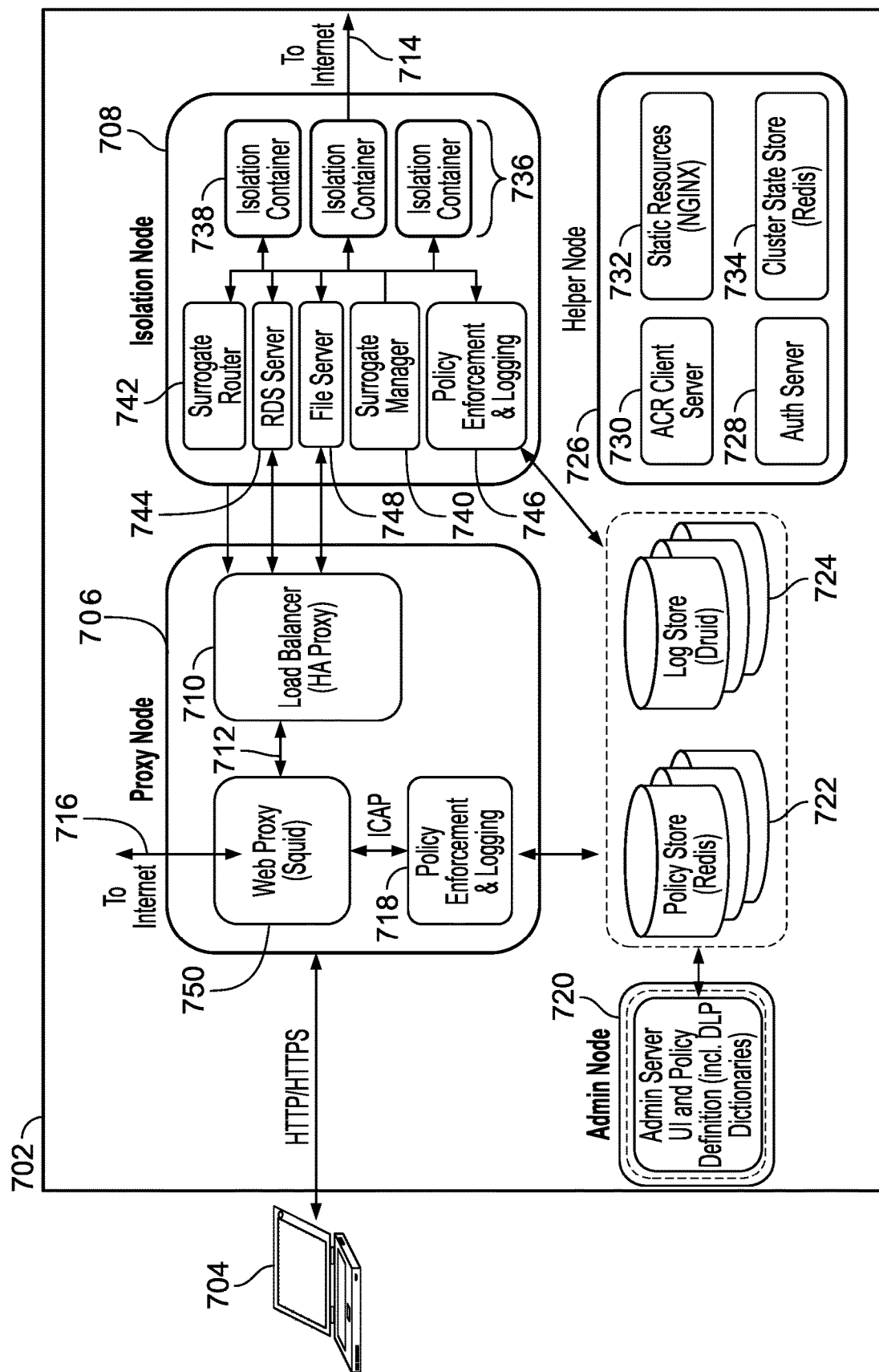
FIG. 7 illustrates an embodiment of an environment in which surrogate browsing services are provided.

FIG. 7 illustrates an embodiment of an environment in which surrogate browsing services are provided. Surrogate browsing system 702 is an embodiment of surrogate browsing system 106. In this example, surrogate browsing system 702 comprises a set of nodes (e.g., each running on Amazon EC2 instances, running a server class operating system such as Ubuntu). While a single node of each type is depicted in FIG. 7, in various embodiments, multiple instances of particular node types are used (e.g., for scalability/performance). As an example, each cluster of isolation, helper, and proxy nodes is configured in a separate AWS Auto Scale group to provide per-cluster elasticity as demand increases and decreases.

Proxy node 706 acts as a gateway to surrogate browsing system 702. Users of surrogate browsing system 702 (e.g., using client 704) enter surrogate browsing system 702 via proxy node 706. As applicable, proxy node 706 performs tasks such as authenticating the user. In some scenarios (e.g., based on a policy applicable to client 704), all of a user's traffic is passed through an isolation node 708 (via load balancer 710). This is illustrated in part, via paths 712 and 714. In other scenarios, some traffic is passed through an isolation node 708, while other traffic is not (illustrated in part, via path 716). Even where the client's traffic is not passed through an isolation now, as applicable, policy enforcement (e.g., allow/block) and logging can still be provided by module 718 of proxy node 706. One way of implementing module 718 is by using node.js. In the environment shown in FIG. 7, policies (configurable, e.g., via administration node 720) are stored in policy store 722 and logs are stored in log store 724.

As applicable, proxy node 706 can be configured to provide data loss (or leak) prevention (DLP) services to traffic associated with client 704. This can be helpful, e.g., where client 704's traffic exits to the Internet via path 716, rather than through isolation node 708. As will be described in more detail below, more robust DLP services can be provided when client 704's traffic is processed through isolation node 708.

Helper node 726 generally provides supporting functionality to isolation node 708. For example, helper node 726 includes an authentication server 728 for authenticating users of surrogate browsing system 702. Further, when a client first connects to surrogate browsing system 702, ACR client server 730 provides a copy of a thin client (stored as a static resource along with other static resources 732 such as company logos, boilerplate text, etc.) to the client browser. Finally, cluster state store 734 is responsible for maintaining/synchronizing external state (e.g., which isolation container 736 is currently assigned to a client).

Although pictured in FIG. 7 as having an isolation node 708, in various embodiments, a single proxy node (e.g., proxy node 706) makes connections to many isolation nodes, as handled by load balancer 710. A given isolation node (e.g., isolation node 708) in turn makes use of many isolation containers 736 of which isolation container 738 is an example. Each isolation container comprises multiple processes each running in a sandbox comprising a Chromium browser process, an isolated Chromium renderer process, an isolated Flash process, and an isolated resource rewriter. A dedicated Chromium renderer process runs for each browser tab, providing isolation between tabs.

The various components of isolation node 708 can be implemented using a variety of tools, such as a combination of python scripts, C++, and node.js. Surrogate router 742 steers incoming traffic, pairing requests (to pair a client with an isolation container), etc. to an appropriate isolation container (e.g., in consultation with cluster state store 734). Surrogate manager 740 manages the isolation containers in an isolation node (e.g., keeping track of which isolation containers are busy/available, growing/shrinking the pool of isolation nodes as needed, and communicating such information with cluster state store 734). Remote desktop server (RDS) server 744 is responsible for encoding VNC updates and sending them to a client's thin client. Similar to module 718, module 746 provides policy enforcement and logging services for isolation node 708.

Finally, file server 748 is responsible for handling files uploaded (and downloaded) by clients. As an example, suppose Alice is currently accessing (via a surrogate browsing session) a web page that supports file uploads. Alice initiates a file upload (e.g., by clicking on an upload button). The surrogate browser detects that the website has initiated a request for an upload and sends a file request message to the thin client. The thin client displays a file selection dialogue on the endpoint browser, Alice selects a file, the thin client receives a file handle, and the thin client facilitates a multi-part upload of the file to the surrogate browsing system (e.g., by posting the file into the surrogate browser). Upon completion of the upload, the surrogate browser uses a REST API to inform file server 748 that a file upload has completed, at which point file server 748 can perform one or more policy checks (e.g., based on the file type which can be determined based on file extension, an introspection tool such as magic, etc., as well as the website and website categorization that the file will be uploaded to) by calling module 746. The types of checks that can be performed are pluggable/configurable by an administrator (e.g., Alice's employer, ACME Bank). Examples of such checks include multi-vendor hash checks (e.g., to determine whether the file is known to be malicious), full file scans, file detonation sandboxing, DLP, etc. If the policy checks succeed (i.e., it is determined that uploading the file to the web page does not violate any policies), the surrogate browser uploads the file to the web page. If the policy checks fail, an appropriate action can be taken based on the policy (e.g., block, log, etc.). In addition to performing checks, other actions can be specified to be taken via a REST API. As an example, ACME Bank might have a requirement that all files uploaded or downloaded to surrogate browsing system 702 be archived. As another example, ACME Bank might have a watermarking tool that is configured to watermark all documents (PDF, PPT, DOC, etc.) that are uploaded to external sites. Such tool can be called via the REST API. As another example, ACME Bank might have a redaction tool that is configured to redact or otherwise modify certain types of information from documents prior to sending them to external sites.

A similar two-stage process is performed when Alice attempts to download a file from a web page (i.e., the file is transferred from the web page to the surrogate browsing system, applicable checks are performed, and the file is then transferred from the surrogate browsing system to Alice via the thin client if policy allows). In various embodiments, surrogate browsing system 702 provides additional functionality regarding file downloads. As one example, suppose Alice is attempting to download a ZIP file. Assuming the file passes any applicable checks, Alice can be presented by surrogate browsing system 702 (via the thin client) with an option of unzipping the ZIP file at the surrogate browsing system, and only downloading portions of its contents. As another example, instead of downloading a policy-checked PDF from the surrogate browsing system to her browser, Alice can be given the option of viewing the PDF (e.g., after conversion to HTML) at the surrogate browsing system, downloading a simplified PDF, etc. Further, while the functionality of file server 748 has been described in the context of file uploads/downloads via websites, the same infrastructure can be used for handling other types of file transmission, such as email attachments. Similarly, the policy enforcement described as being performed on files can also be performed on other kinds of input, such as user input. For example, if Alice attempts to paste credit card numbers from her clipboard to a site such as pastebin.com, that input can be checked first, and blocked, as applicable.

III. Pairing and Communication Channels

Figure 8:
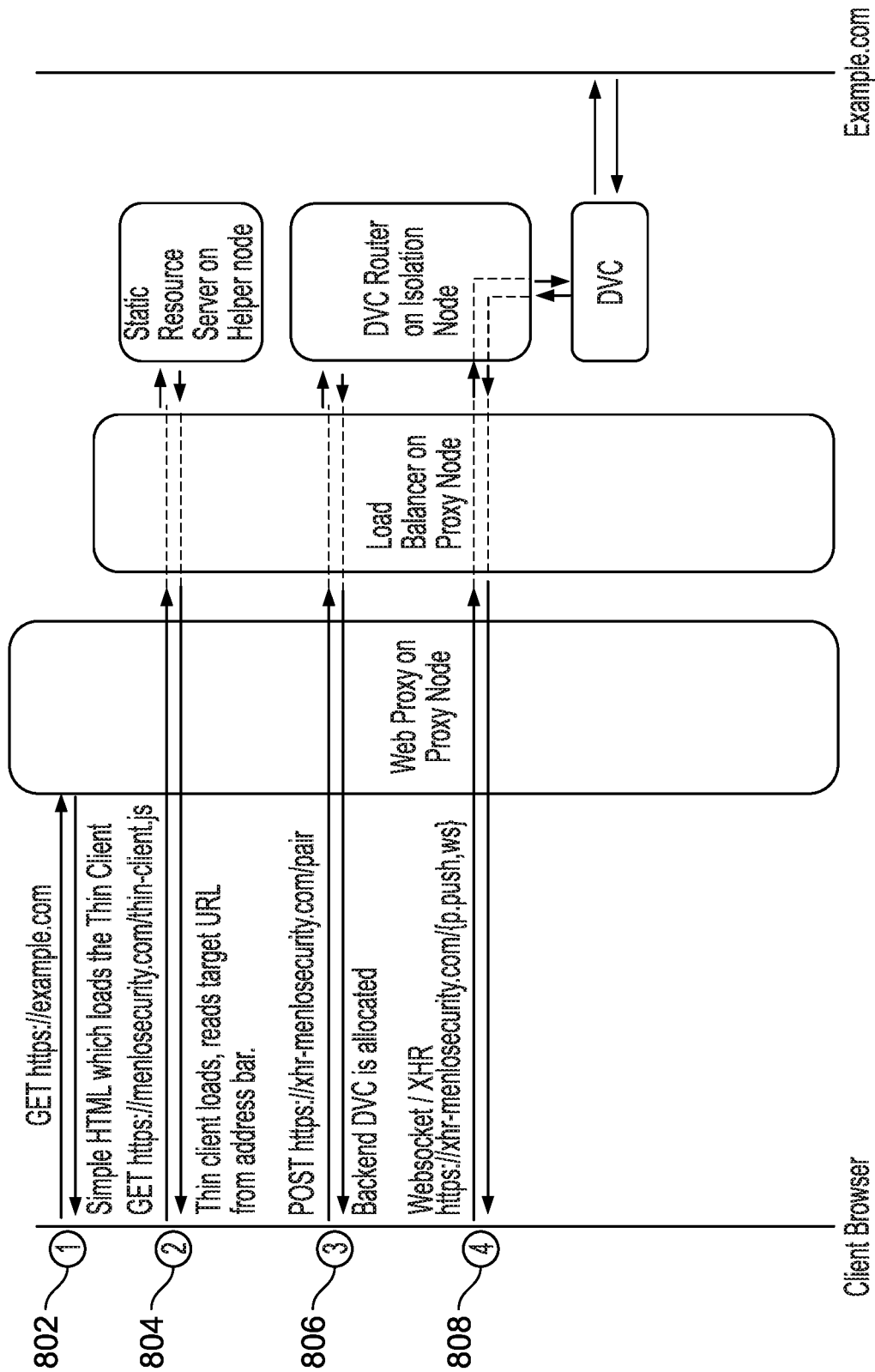
FIG. 8 is a flow diagram that illustrates the initialization of a surrogate browsing session.

FIG. 8 is a flow diagram that illustrates the initialization of a surrogate browsing session. First (802), the client browser requests a page. In the example shown in FIG. 8, the request is made to https://example.com. This is handled by proxy service 750 on proxy node 706. Proxy service 750 returns basic HTML that is independent of the site-to-be-visited. Content is not fetched from example.com in this step, but an SSL tunnel is established with example.com to allow for the mimicking of properties of the example.com certificate as part of the TLS inspection. The SSL connection to example.com is then terminated by proxy service 750.

Second (804), the HTML returned during 802 includes a tag to load JavaScript referred to herein as the "thin client." This JavaScript is loaded from helper node 726. It is the same for all visited pages and will be cached by the client browser after the first visit to any site.

Third (806), the thin client JavaScript starts executing in the client browser. The thin client consults the address bar to get the URL of the page the user wants to load and POSTs it to xhr-menlosecurity.com/pair. At this point, a Disposable Virtual Container (DVC), also referred to herein as an isolation container, is allocated for the user, if necessary. The DVC for the user is then instructed to create a tab and navigate it to example.com. The DVC starts loading example.com. At this point, no information from example.com has been sent to the client browser.

Finally (808), a communication channel with the DVC is established and information starts flowing bidirectionally to the client: rendering data flows from the DVC and user input (mouse, keyboard) flows to the DVC. This communication occurs over a websocket if a websocket can be established. Otherwise, communication occurs via multiple XHR requests.

FIG. 9 illustrates different communication channels used in various embodiments. Channel 902 is used to relay user input (mouse, keyboard) to the DVC. Channel 904 is used to relay rendering information to the client browser. As mentioned above, if possible, a websocket is used. Otherwise, XHRs are used. Channel 906 is a dedicated channel for uploads. The original destination URL (example.com) is a URL parameter (page url). Channel 908 is a dedicated channel for downloads. The original source of the file (example.com/file.bin) is a URL parameter (file url) as well as in a response header (X-Msip-Download). Additional information is also present in the response headers: X-Msip-User has the user ID, X-Msip-Download-Source has the URL of the page from which the file is downloaded, and X-Msip-Download-Hash has the hash of the file content (SHA256). Finally, channel 910 is used to relay user input before being sent to the visited site. It uses a standard form POST to capture input to the page so far.

IV. Handling Encrypted Files

In the following discussion, suppose that Alice, an employee of ACME Bank, is using surrogate browsing system 702 at work, and that ACME Bank would like to prevent (e.g., via DLP) sensitive financial and other information from being exfiltrated from the bank (e.g., via bank computers). As a specific example, suppose ACME Bank would like to prevent credit card information from being exfiltrated (e.g., in files uploaded by users).

A. Configuring DLP

Figure 17:
FIG. 17 illustrates an example of an interface.

In order to configure a new DLP rule for credit cards, an ACME Bank administrator first accesses a tenant administration portal served by administration node 720. An example of that interface is shown in FIG. 10. The administrator clicks on "Add New Rule" and is presented with the interface shown in FIG. 11. The administrator names the rule and specifies an end-user notification message to display. Next, the administrator specifies that the rule applies to file uploads, as shown in FIG. 12. The administrator then specifies which users/groups of users should be subject to the rule, and for which sites the rule applies, as shown in FIG. 13. As shown in FIG. 14, the administrator can create a DLP auditor profile for alerting (e.g., via email) when the rule is violated, and specify contact information for those auditors. If desired, the auditors can receive a copy of the problematic file by selecting the appropriate option in the interface. The administrator can then attach the DLP auditor profile to the DLP rule and specify what action to take upon a rule violation, such as block, allow and log/alert, etc. (as shown in FIG. 15). The administrator next specifies which dictionaries should be used to look for rule violations (e.g., text containing credit card numbers in this example) as shown in FIG. 16. The dictionaries made available in interface 1600 can comprise both custom dictionaries (e.g., of words/phrases unique to ACME such as internal product names, internal IP addresses, etc.) and more generally applicable dictionaries (e.g., made available as part of a subscription service provided by system 702 and/or a third party, as applicable). Examples of dictionaries include compliance rules, rules pertaining to particular verticals (e.g., healthcare vs. finance), regionally applicable privacy rules, etc. Finally, the administrator saves the rule (the result of which is shown in FIG. 17). The finished rule is published by the administration node to other nodes as applicable (e.g., proxy node 706 and isolation node 708).

B. Triggering DLP

Suppose Alice creates a Microsoft Word document that contains a list of credit card numbers. She protects the document via a password, which encrypts the document using the ECMA-376 standard, rendering its content unreadable at the network/proxy level (e.g., to a typical proxy, firewall, or other network device). Other document types and encryption schemes can also be used in accordance with techniques described herein. After saving the document, Alice attempts to exfiltrate it by visiting a website to which it can be uploaded. In this example, the website is a DLP test website (dlptest.com). Other examples of sites that she could use include box.com, dropbox.com, onedrive.com, etc.

Figure 18:
FIG. 18 illustrates an example of an interface.

When Alice uses client 704 to access dlptest.com with her browser (via surrogate browsing system 702), the site is automatically isolated (e.g., in isolation container 738). An example of the upload interface of dlptest.com is shown in FIG. 18. When Alice clicks on region 1802, or drags the Word document to region 1802, surrogate browsing system 702 will identify that dlptest.com is requesting a file upload. It communicates (via the thin client) with her browser to initiate the file upload to isolation container 738 (via a standard POST). At this point, no portion of the file has been transmitted to dlptest.com. This prevents any complex/obfuscated protocols (e.g., employed by the remote website) from hiding the data, allowing for full inspection of the upload between client 704 and isolation container 738.

Figure 19:
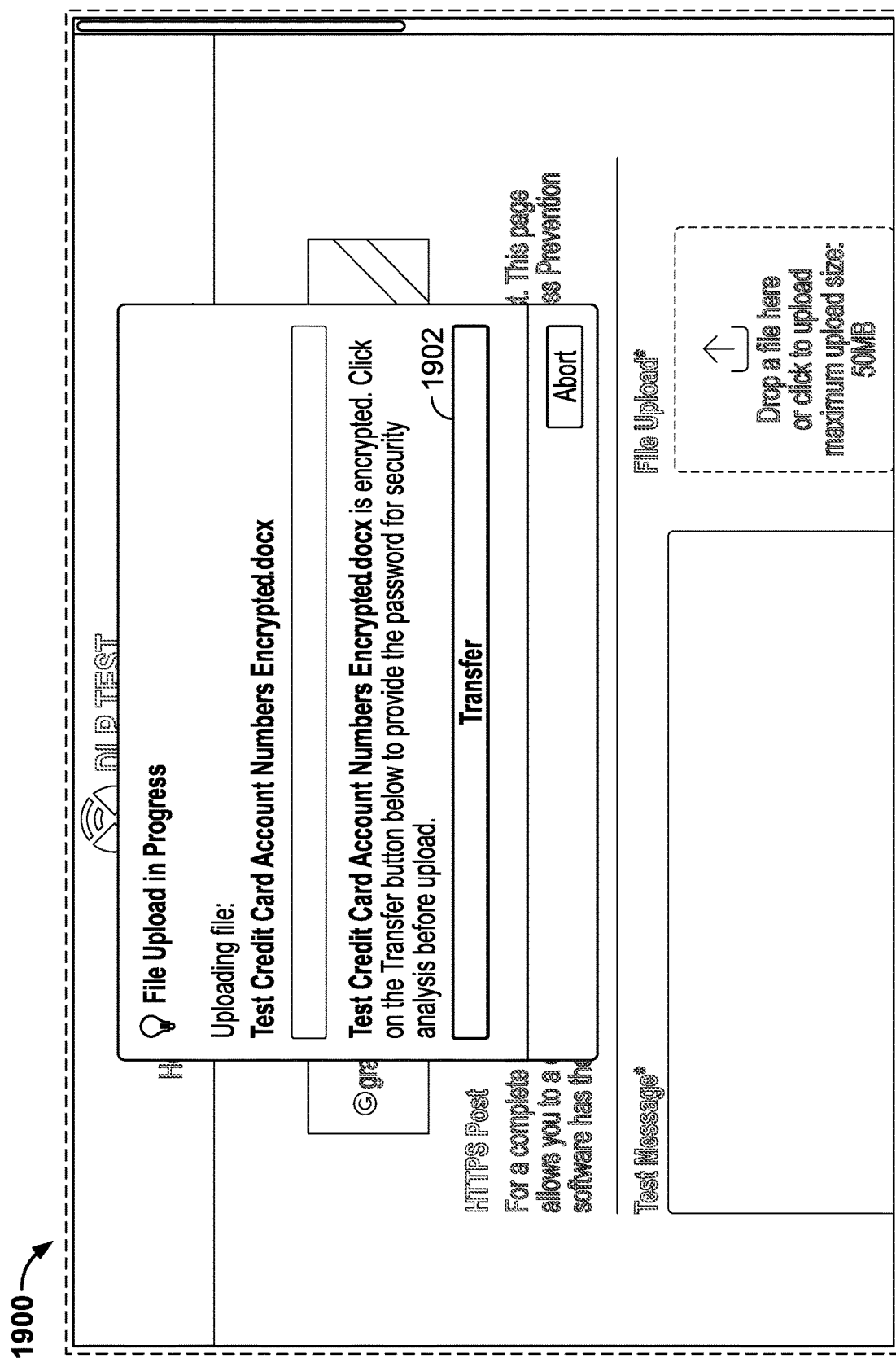
FIG. 19 illustrates an example of an interface.

When the file upload is completed from client 704 to isolation container 738, as described above, the isolation container will notify file server 748. File server 748 identifies that the uploaded file is an encrypted file. Because surrogate browsing system 702 controls the client browser and the response to the remote website, and also has the entire file, system 702 (e.g., via file server 748 which also includes web server functionality) is able to prompt Alice (via the thin client) for the password needed to decrypt the file. An example of such a prompt, rendered in an interface, is shown in FIG. 19. If Alice clicks on region 1902, she will be presented by surrogate browsing system 702 with a password submission interface such as is shown in FIG. 20. The interface can be customized by an administrator to include an applicable corporate logo, custom text, etc. (stored as static resources 732), to help Alice be confident that the password request is not a phishing attempt (e.g., by dlptest.com). Further, information such as the destination (e.g., dlptest.com) is shown in interface 2000 to help Alice confirm that the site to which she is attempting to upload the file is indeed the location she is intending to upload to.

If Alice is unable to supply a valid password (or clicks cancel) during the upload process, the file upload can be blocked (or allowed but with additional logging, notifications sent, etc., as applicable) as configurable by an administrator. Further, as applicable, system 702 can attempt to decrypt the file without Alice's password (e.g., where the file is protected with weak encryption and can be brute forced.) If the correct password is entered, the file is decrypted within isolation container 738 (or other appropriate location within surrogate browsing system 702, such as a temporary container used by system 702 while analyzing the file) and further content inspection can take place before the file starts to upload to the dlptest.com website. Examples of such content inspection include identifying malware present in the decrypted file, capturing the decrypted file and pushing it to a customer owned archive store and/or customer provided email address, examining the document for attempted data exfiltration, and pushing the document out via a REST API to a customer specified system (which can return back a modified version of the file, e.g., that has parts redacted, removed, modified, or watermarked which will replace Alice's original file during upload to the external website). Further, different rules can be applied in different contexts, e.g., allowing Alice to upload her document to an internal website based on policy, while preventing Alice from uploading the same document to an external website. In addition, in some cases, a given encrypted file may include within it additional encrypted files (e.g., an encrypted ZIP file containing another encrypted ZIP file, containing an encrypted document). As checks are performed by surrogate browsing system 702, Alice can be prompted to supply passwords for any additionally encountered encrypted files which can in turn be checked as well.

Figure 21:
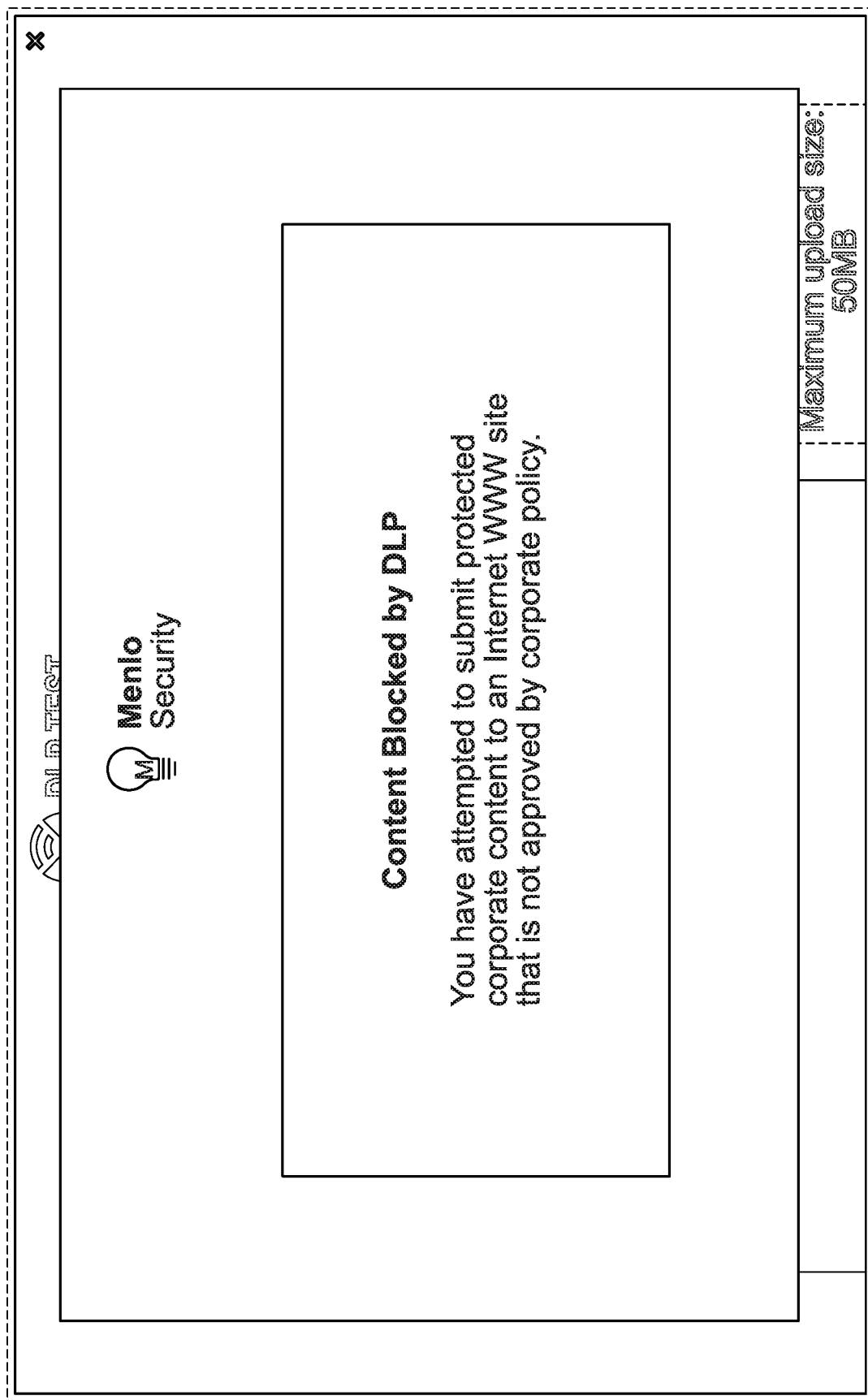
FIG. 21 illustrates an example of an interface.
Figure 22:
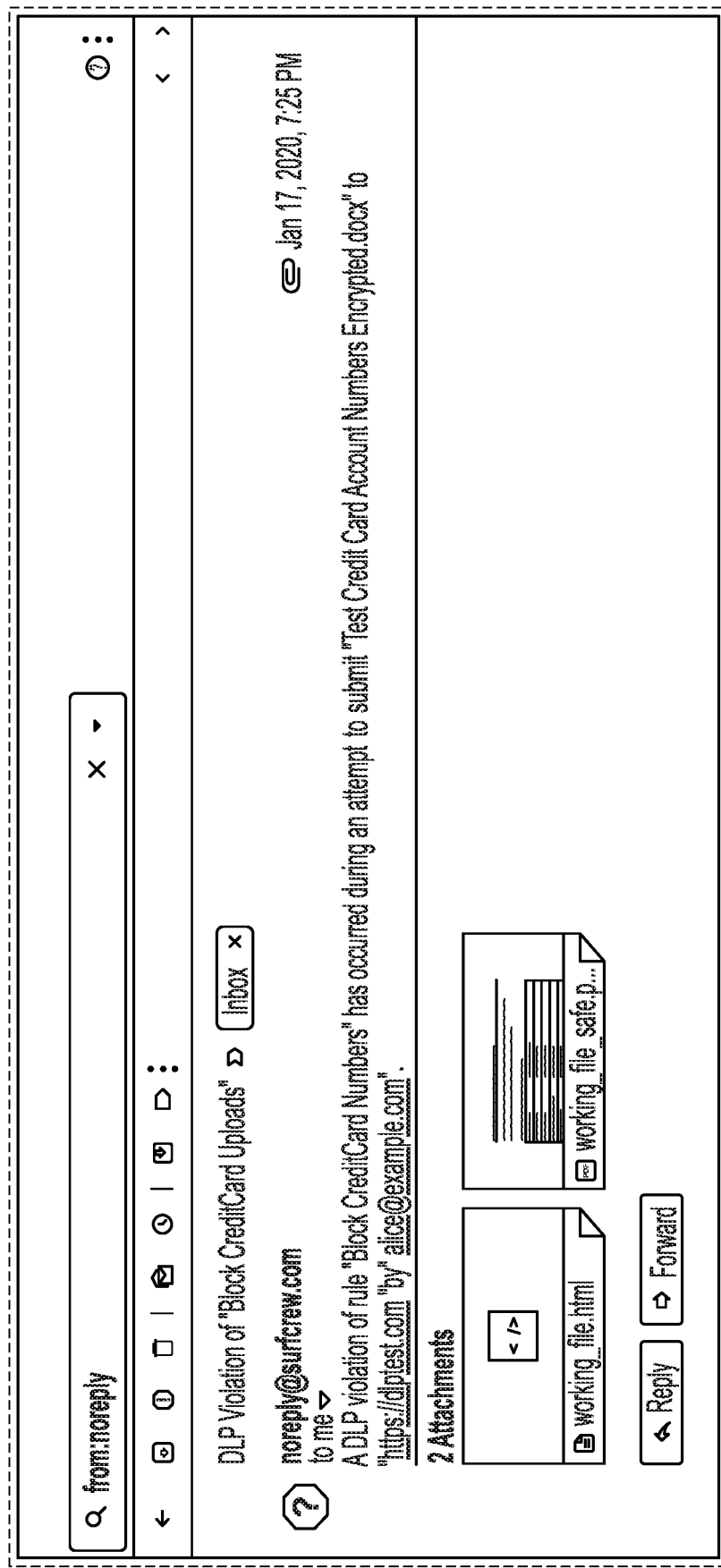
FIG. 22 illustrates an example of an email notification.

In the example shown in FIG. 21, Alice has provided the correct password for the document to surrogate browsing system 702. After decryption, surrogate browsing system 702 determines that contents of the file (i.e., credit card numbers) trigger the DLP rule shown in FIG. 17 and blocks the upload accordingly. In addition to notifying Alice that the file upload is blocked by policy, additional actions can also be taken as specified by the rule (e.g., logging, email notification, etc.). An example of a notification email that can be sent to auditors is shown in FIG. 22 and such notification can include attachments (e.g., including a (decrypted) copy of the file, a screenshot of the file, etc.) as applicable.

C. Example Workflow

Figure 23:
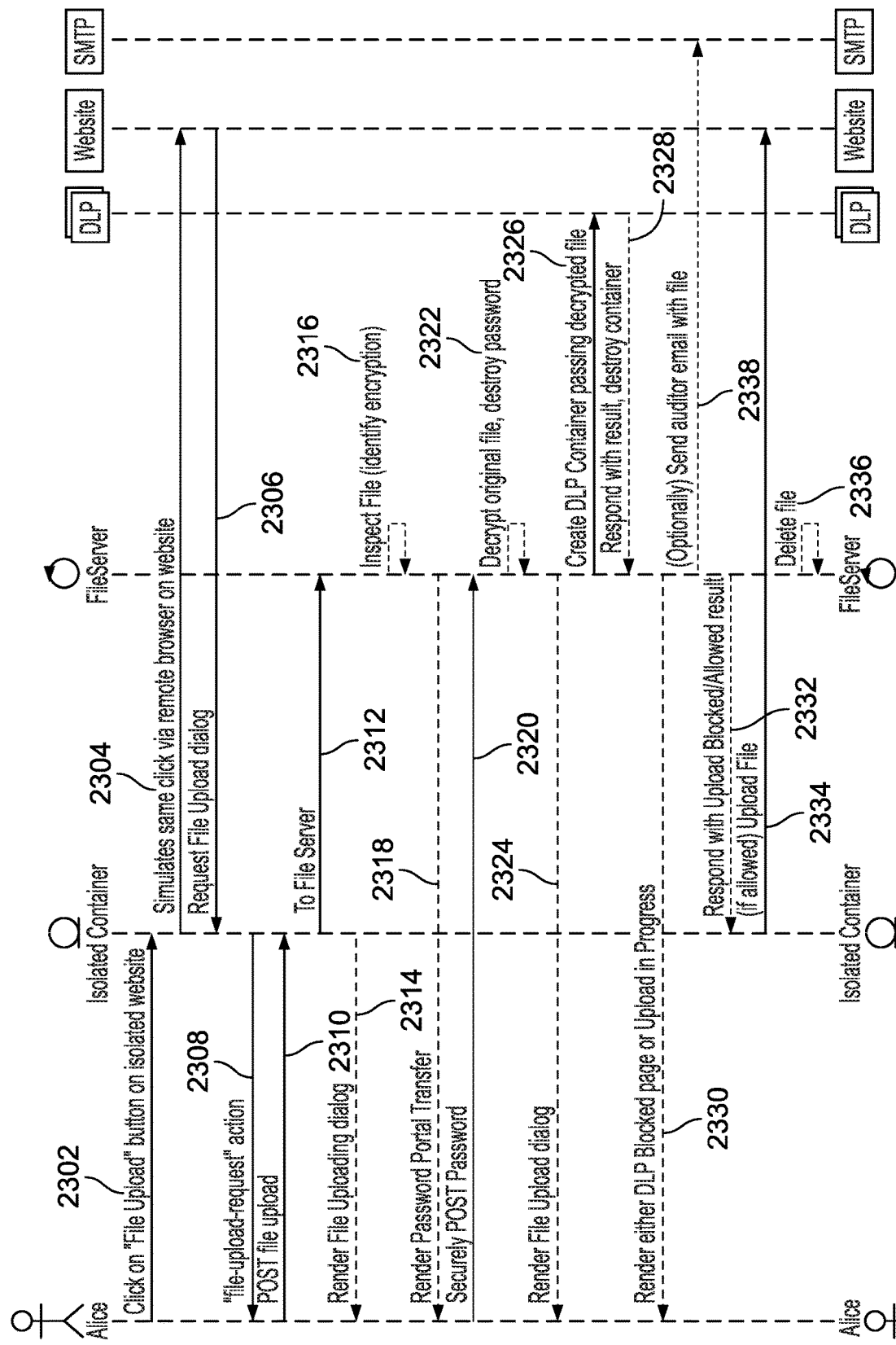
FIG. 23 is a flow diagram that illustrates a file upload.

FIG. 23 is a flow diagram that illustrates a file upload. First (2302) a user (e.g., Alice) clicks on a file upload button on an isolated website, which is intercepted by the isolated container. The isolated container simulates the same click to the remote web site (2304). The remote website responds with a request file upload dialog (2306), which is passed on by the isolated container to Alice's client (2308). Alice selects a file (e.g., using a file chooser), which results in her browser performing a POST file upload (2310) from her browser to the isolated container. Once the upload is complete, the isolated container informs the file server (2312) which inspects the file and identifies that it is encrypted (2316). The file server, as it is also a web server, provides a password submission portal to Alice's browser (2318). After entering a password, her browser performs a POST of the password to the file server (2320). The file server uses the password to decrypt the file (2322), creates a container for analyzing the decrypted file (2326), analyzes the decrypted file, and responds with analysis results (2328), while displaying a file upload dialog to Alice (2324). Based on results of the analysis, either an upload progress bar, or a block message (or another appropriate message) is shown to Alice (2330). Further, as applicable, an auditor email can be sent (2338). The analysis result (e.g., block or allow) is provided by the file server to the isolated container (2332). If the upload is allowed, the isolated container provides the file to the website (2334). When processing is complete, the file server deletes the file (2336).

Figure 24:
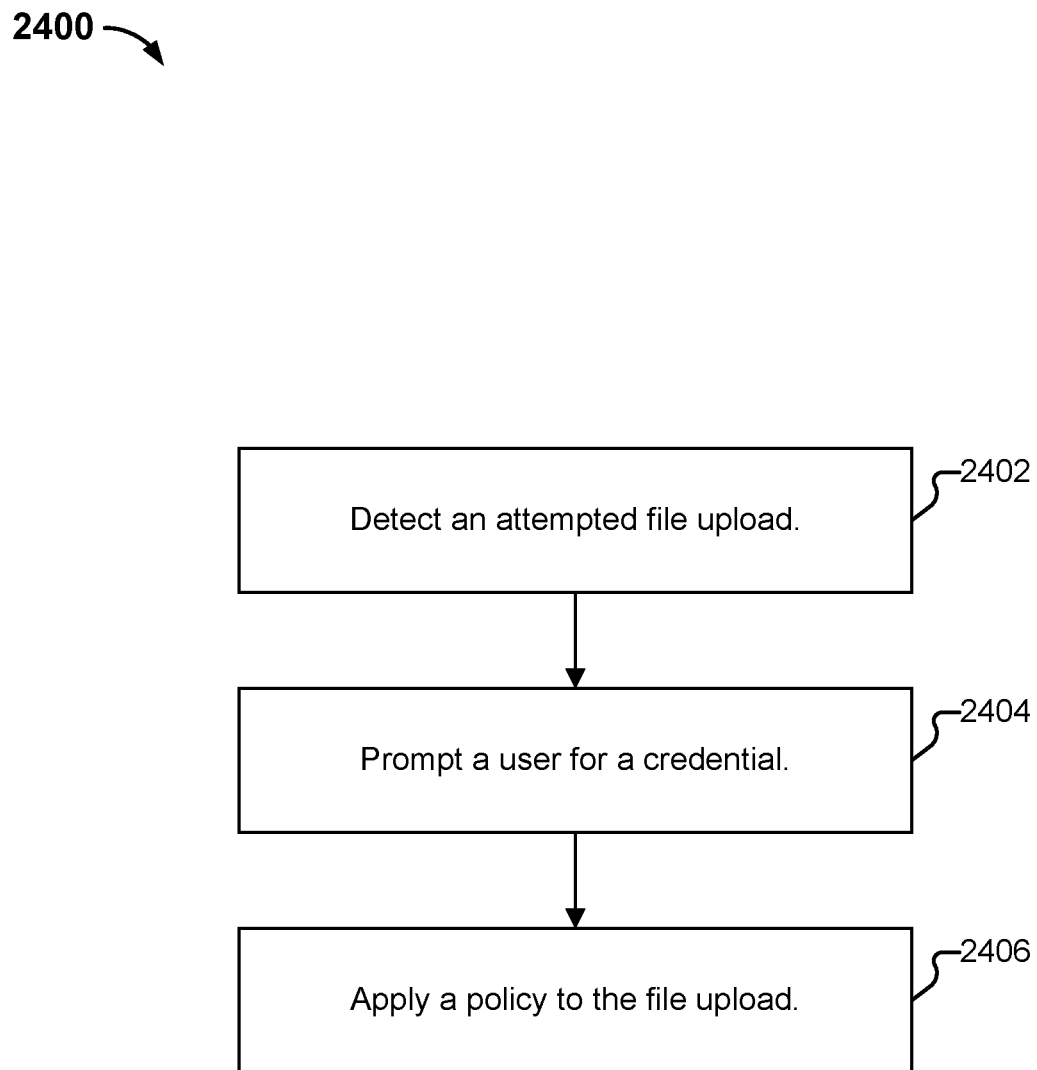
FIG. 24 illustrates an embodiment of a process for providing DLP to file uploads.

FIG. 24 illustrates an embodiment of a process for providing DLP to file uploads. In various embodiments, process 2400 is performed by surrogate browsing system 702. The process begins at 2402 when an attempted file upload is detected. An example of such file detection occurs when an isolation browser receives a request file upload dialog from a remote website (e.g., at 2306 in FIG. 23). At 2404, a user is prompted for a credential. An example of such prompting occurs when surrogate browsing system 702 provides Alice with interface 1900 shown in FIG. 19. Finally, at 2406, a policy is applied to the file upload. As one example, if the user provides a valid credential (e.g., that decrypts an encrypted file) and any applicable checks performed on the file succeed (e.g., no DLP or other violations are found), at 2406, the file is uploaded by surrogate browsing system 702 to the remote website. As another example, if the user fails to provide a credential, clicks cancel, etc., the file upload attempt can be terminated. As yet another example, if the user provides a credential, but the file is determined to violate one or more policies, appropriate actions can be taken, such as notifying an auditor, alerting the user that the file upload is blocked, etc.

V. Protecting Web Applications from Untrusted Endpoints Using Remote Browser Isolation The following section describes embodiments of a surrogate browsing system that can protect web applications from untrusted endpoints using remote browser isolation. Suppose ACME Bank (Alice's employer) recently purchased a software company (BetaCo). Prior to the purchase, ACME Bank and BetaCo maintained separate corporate networks, and merging them will take some time. While the process is underway, it would be advantageous to give access to various applications to former BetaCo (now ACME Bank) employees. Examples of such applications include an ACME Bank internal timecard application, an internal Wiki System, and collaboration tools (e.g., Jira and Confluence). The applications may be hosted within ACME Bank's enterprise data center infrastructure and/or may be hosted using third party cloud infrastructure (e.g., Amazon VPC, Azure Cloud, and Google Cloud). Access to such applications is restricted to specific IP addresses or IP address ranges that correspond to ACME Bank infrastructure.

One approach to granting application access to the new ACME Bank employees is to provide them with workstations (laptops, etc.) configured with VPN software (so that their IP addresses are within the ACME Bank infrastructure). Unfortunately, this approach can be problematic. The BetaCo employees already have workstations. They will either need to be provided with new hardware (which can be expensive and take time and administrative overhead) or have their existing workstations configured to support the ACME Bank VPN. This latter approach can also be time consuming and potentially present security risks: ACME Bank will likely have a first set of security requirements for its workstations (e.g., based on banking industry standards), and BetaCo may use different standards (or fail to conform to such standards). Accordingly, in the latter approach there is a potential risk that even with an ACME Bank VPN deployed on a BetaCo workstation, the BetaCo workstation poses a security threat to ACME infrastructure. In a related scenario, ACME Bank may wish to hire temporary contractors to help with the merger (or for other purposes), and equipping them with secured hardware and VPN capabilities will be similarly cumbersome. Further, while VPN technology provides a secure tunnel, it does not protect such internal applications against unfettered access from rogue employees performing attacks against those applications (e.g., SQL injection or other attacks), exfiltrating data from those applications, etc.

Figure 25:
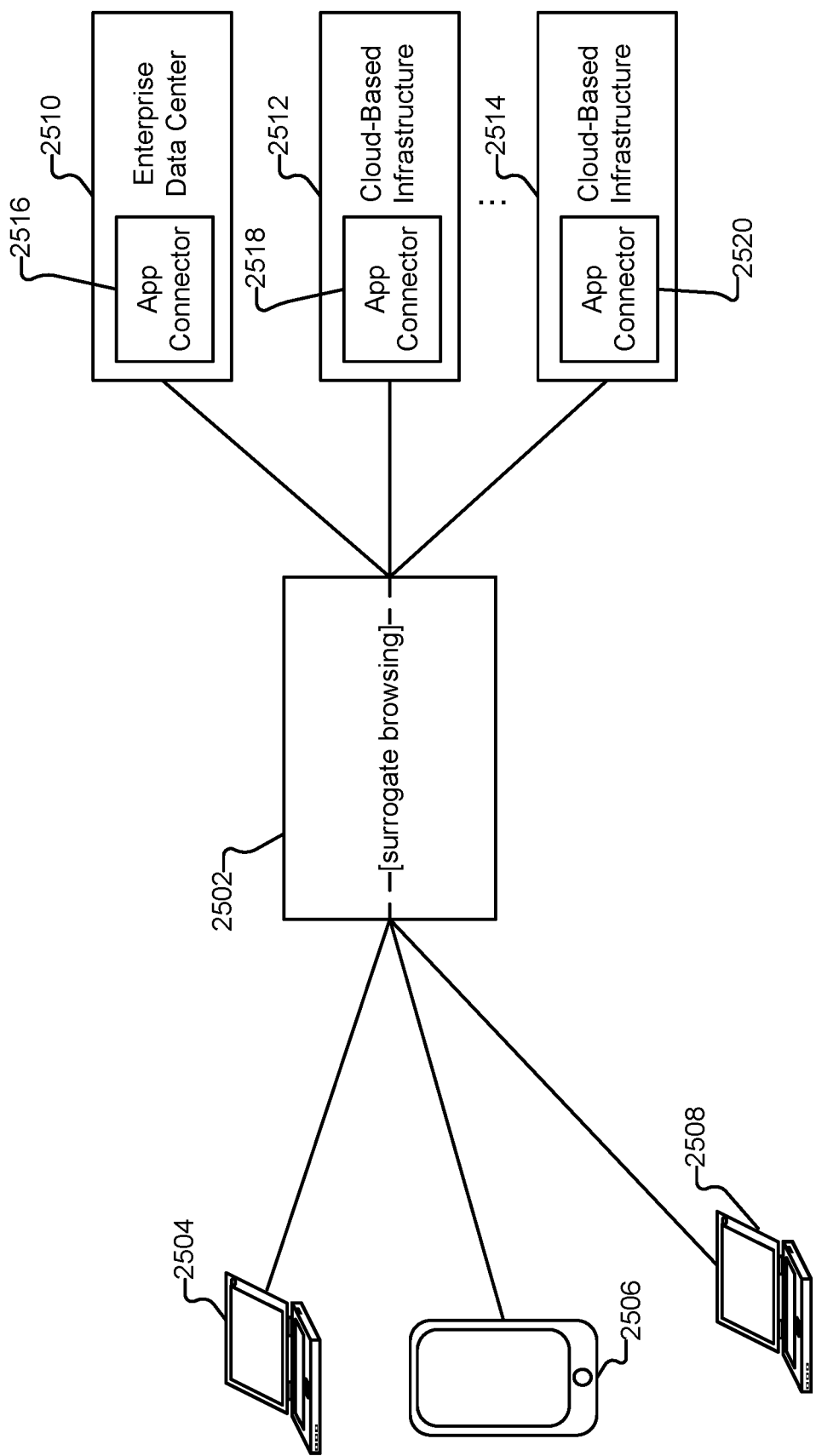
FIG. 25 illustrates an embodiment of an environment in which surrogate browsing services are provided.

An alternate approach to providing (potentially untrusted) endpoints with access to web applications is shown in FIG. 25, and uses various of the surrogate browsing techniques described herein. When employees (or other authorized users) need to access an internal application, instead of using a VPN, they authenticate to surrogate browsing system 2502 and use a catalog to access the application. System 2502 is an embodiment of surrogate browsing system 702 and provides various of the services described above (e.g., in conjunction with FIG. 7). For purposes of discussion, endpoint 2504 is Alice's ACME Bank issued laptop, endpoint 2508 is Dave's BetaCo issued laptop (where Dave is transitioning from working for BetaCo to ACME Bank as part of the merger), and endpoint 2506 is Dave's daughter's tablet device. As mentioned above, ACME Bank makes use of a variety of internal applications, hosted in a variety of manners: Enterprise data center 2510 hosts a timecard application and a Wiki application, and collaboration tools (e.g., Jira, Confluence, etc.) are hosted using cloud based infrastructure 2512-2514.

Using techniques described herein, each of endpoints 2504-2508 can be used to access applications in a secure manner, without needing to install VPN or other agent software (i.e., they can operate agentlessly). Further, using techniques described herein, fine grained control can be provided for restricting access to portions/features of applications (in contrast with a VPN that merely provides a secure tunnel to the application). And, such fine grained control can be provided even to legacy applications (which may themselves lack granular access controls).

Communication between endpoints 2504-2508 and applications (e.g., hosted via infrastructure 2510-2514) is facilitated by application connectors 2516-2520. The application connectors are lightweight pieces of software deployed with a customer's private network (e.g., ACME Bank's private network, data center, or VPC) to establish an outbound secure tunnel to system 2502. This hides the internal network information from the public Internet while allowing system 2502 to connect to the applications behind the connector. Application connectors can be implemented in a variety of ways including as a virtual appliance deployed on a network, and/or as a standalone server. Something that differentiates application connectors 2516-2520 from traditional application connectors is that traditional application connectors do not provide isolation—users are able to directly access the full stack of an application, rather than be limited to accessing applications through a surrogate browser. Other approaches for connecting system 2502 with applications can also be used instead of or in addition to application connectors as applicable. For example, firewall rules can be configured to allow for communication between system 2502 and enterprise data center 2510.

System 2502 provides a per tenant application catalog that enumerates that customer's set of applications that they wish to securely expose externally (e.g., to remote workers, partners, and/or contractors). An example of an application catalog is shown in FIG. 26 and illustrates the applications used by ACME Bank. New applications can be added to the catalog by an ACME Bank administrator by interacting with region 2602 which will take the administrator to an interface such as is shown in FIG. 27. Each item in the catalog contains the necessary information for system 2502 to route traffic via a secure tunnel established by the applicable application connector and resolve the domain names of the configured DNS servers. The DNS servers are behind the connectors and are used to resolve the internal IP addresses in the customer's data center or cloud infrastructure.

An example of an access rule configuration interface is shown in FIG. 28. Edits to configurations can be made by interacting, for example, with the icon shown at 2802, which leads to the interface shown in FIG. 29. Granular user group policies can be defined to control who can access which application, including in which scenarios the application can be accessed, as well as what type of access should be provided. For each access rule, access can be restricted to specific IP addresses (2902) such as branch offices or partner IP address ranges and access rules can be scoped to specific users or groups of users (2906). The rules can be applied to a single application or group of applications (2904) and type of access can be specified (2908), including read-only access (preventing users from performing text-field POST actions for forms or otherwise providing data entry) vs. read-write access, and whether uploads or downloads are permitted.

Figure 30:
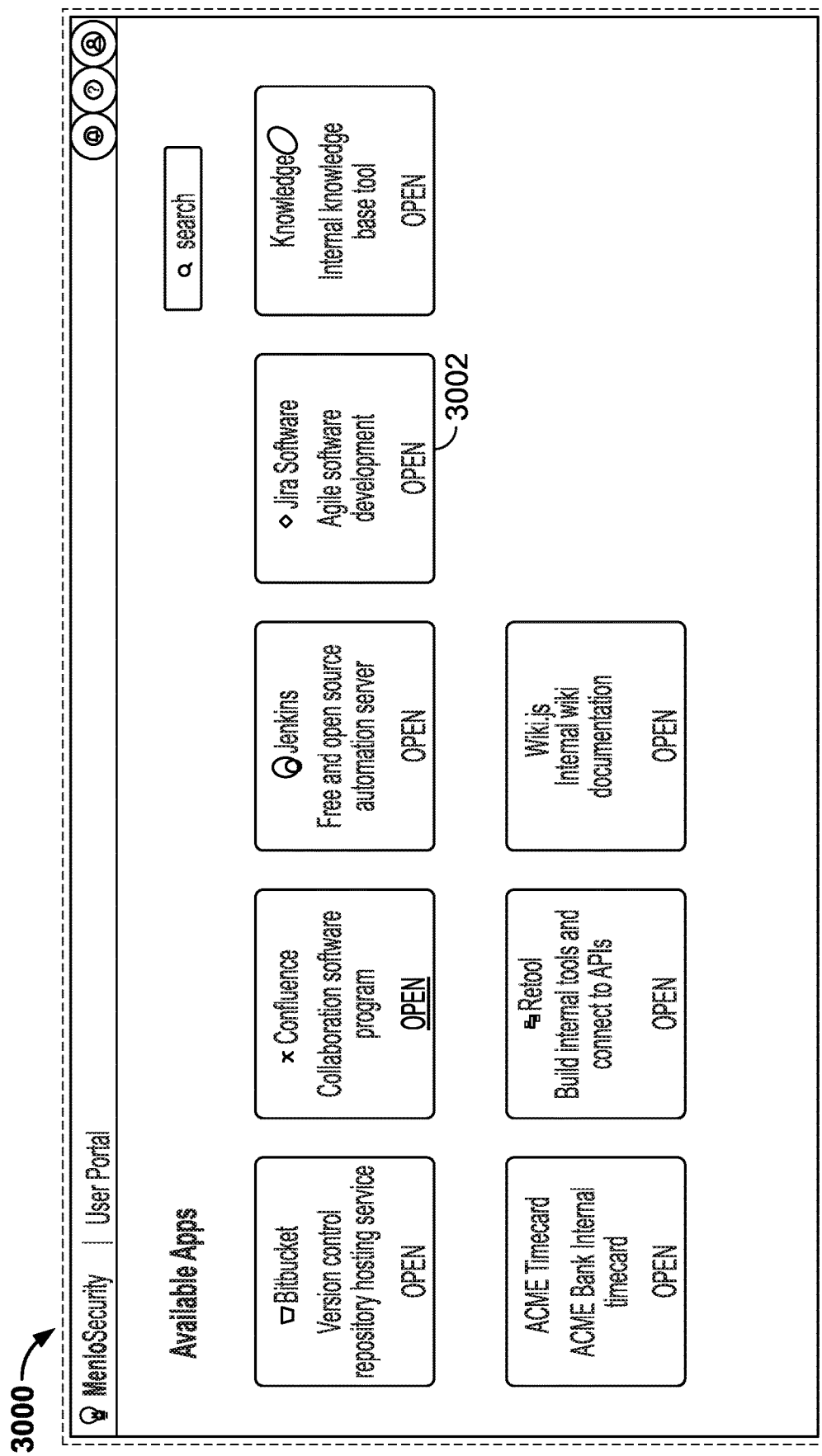
FIG. 30 illustrates an example of a user portal.

FIG. 30 illustrates an example of a user portal, e.g., reachable via the prepend isolation URL https://safe.menlosecurity.com/acemebank.com as applicable (with other tenants' portals made accessible using a similar convention, such as https://safe.menlosecurity.com/examplecorp.com). Alice and Dave can access the portal using any of endpoint devices 2504-2508 (without having to use a VPN). Once authenticated, they'll be shown their respective views of ACME Bank's application catalog (i.e., showing only applications they are respectively authorized to use). Alice and Dave can authenticate in a variety of ways, including by using usernames/passwords, SAML-based authentication, IP-based authentication, etc. Other tenants of system 2502 will be shown their respective application catalogs once authenticated.

Suppose Dave is logged into portal 3000 shown in FIG. 30 and has clicked on region 3002. Jira.acmebank.com is running inside ACME Bank's VPC and an administrator has defined Jira as an application in the application catalog, set up an application connector to the Jira server, and defined in the application catalog that jira.acmebank.com belongs to the private Jira application. When Dave's request (via clicking region 3002) is transmitted from his client device (e.g., endpoint 2508) to system 2502 to jira.acmebank.com, that traffic is routed to the appropriate application connector, and then using the application catalog's DNS servers, jira.acmebank.com is resolved through ACME Bank's internal IP address using its own VPC thereby establishing a full end to end path. However, not only is Dave securely connected to the Jira application, his browsing session is occurring using the surrogate browsing technologies described above, meaning that while he can access the Jira application, the underlying web structure of the application (the entire software stack) is hidden from him, preventing him from engaging in nefarious actions such as client-side tampering and DOM manipulation. This obviates the need for having an endpoint agent installed on his client device to check for security issues on his endpoint, obviates the need for client-side certificates, and indeed, means non-corporate-issued devices (e.g., Dave's daughter's personal tablet) can be used to securely access applications, even if they are infected/compromised.

In various embodiments, any URLs associated with their use of applications in the application catalog are rewritten by system 2502 to obfuscate any information included in the URLs. As an example, to access a particular Jira ticket, a user can be required to navigate to the ticket by accessing the portal, clicking on the Jira application, and performing a search within the application (or otherwise navigating to the ticket by clicking on links/interacting with the application). Attempts to navigate directly to the ticket (e.g., by typing safe.menlosecurity.com/jira.acmebank.com/ticket1234.html) will fail, preventing a user from taking such actions as walking through a site programmatically using URLs.

Figure 32A:
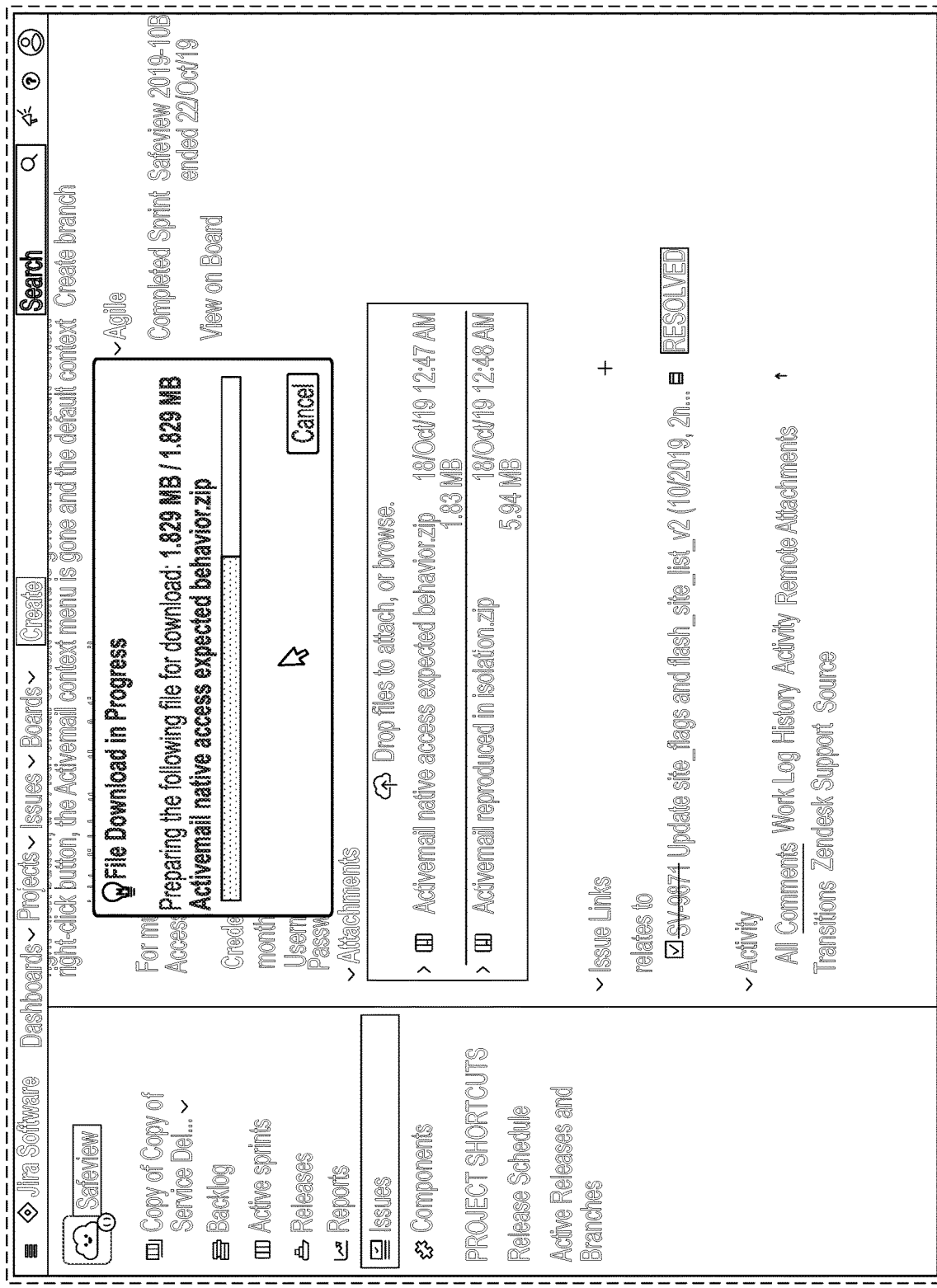
Figure 32B:
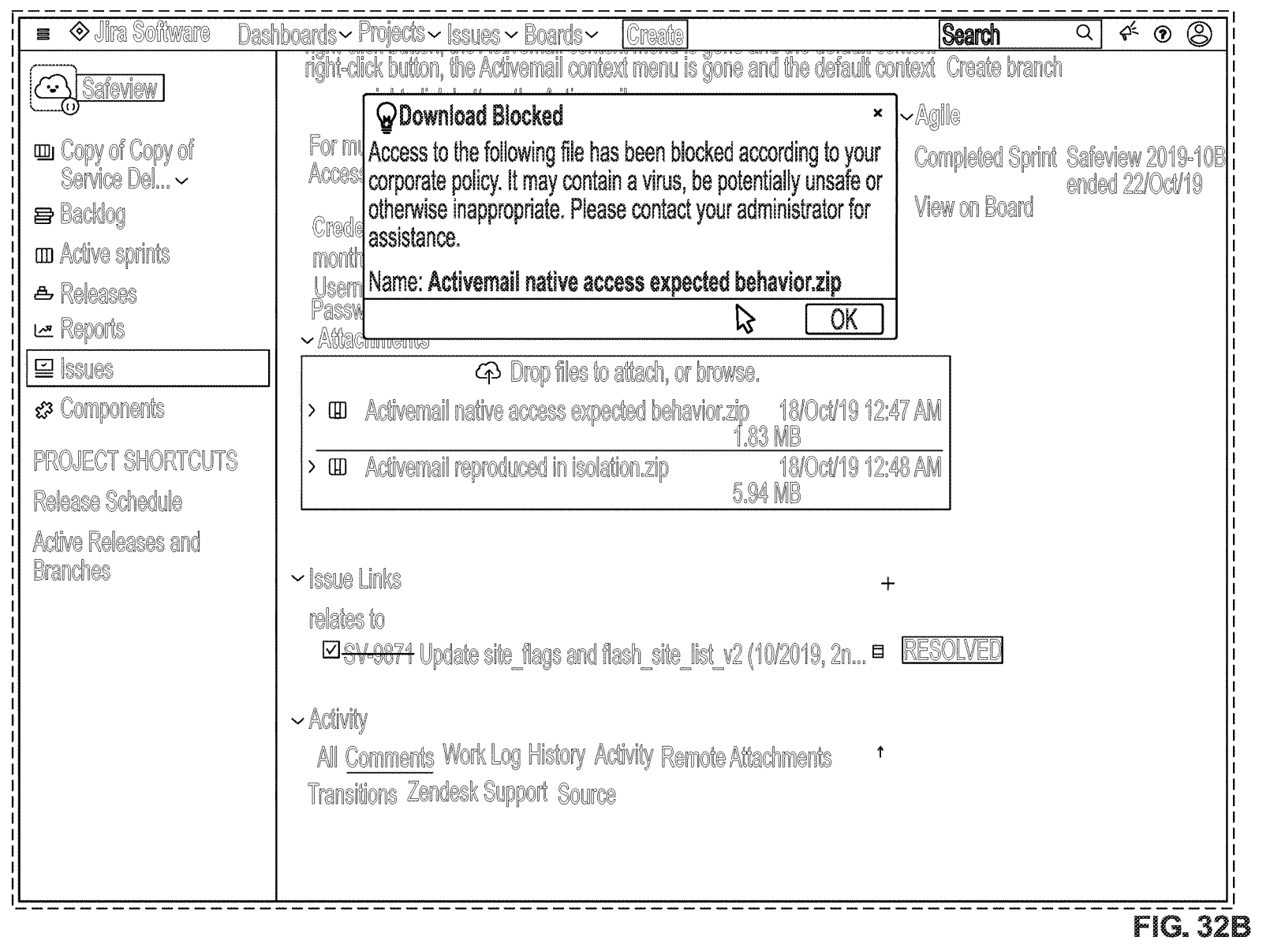

FIG. 31 illustrates an example of a Jira web interface. ACME Bank uses Jira for tracking product development, sprint planning, and tracking both internal and customer issues. Some Jira tickets can contain sensitive information about customer environments such as network traces and user data. ACME Bank would like to limit which of its Jira users can download attachments (e.g., allowing download capabilities for Alice but not for Dave). Using the interface shown in FIG. 31, Dave will be able to view details of Jira tickets, but prevented (via techniques described above) from downloading attachments. When he clicks on link 3102, system 2502 can prevent Dave from accessing the attachment, as shown in FIGS. 32A and 32B. In particular, his click causes the file to be downloaded to system 2502 (FIG. 32A), which upon performing applicable checks, determines that the file should not be provided to his endpoint device (FIG. 32B). Of note, Jira does not natively provide the ability to specify granular access controls of who can download attachments—the ability to provide such controls is due to the infrastructure provided by system 2502.

Figure 33A:
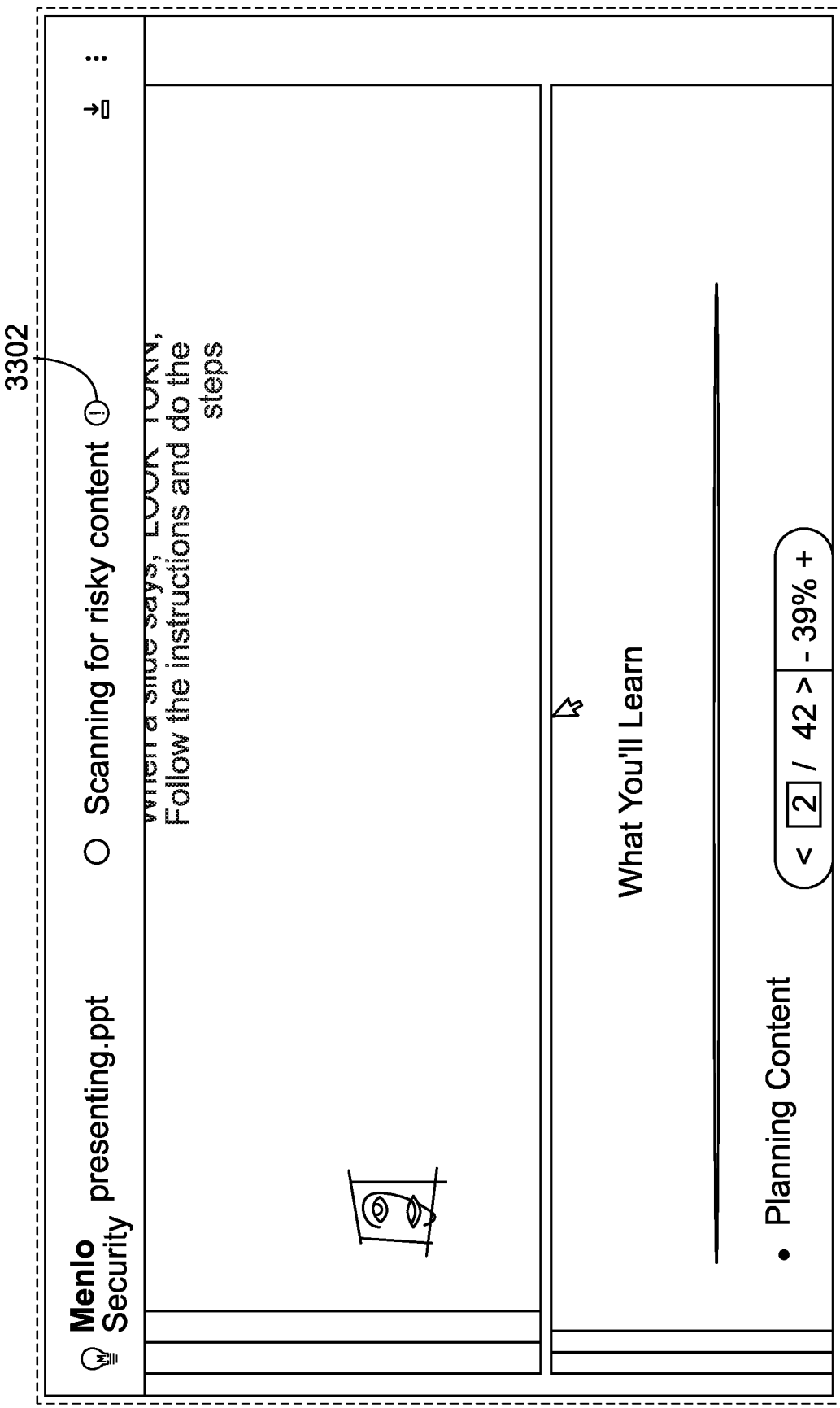
FIG. 33A illustrates an example of a file viewer.
Figure 33B:
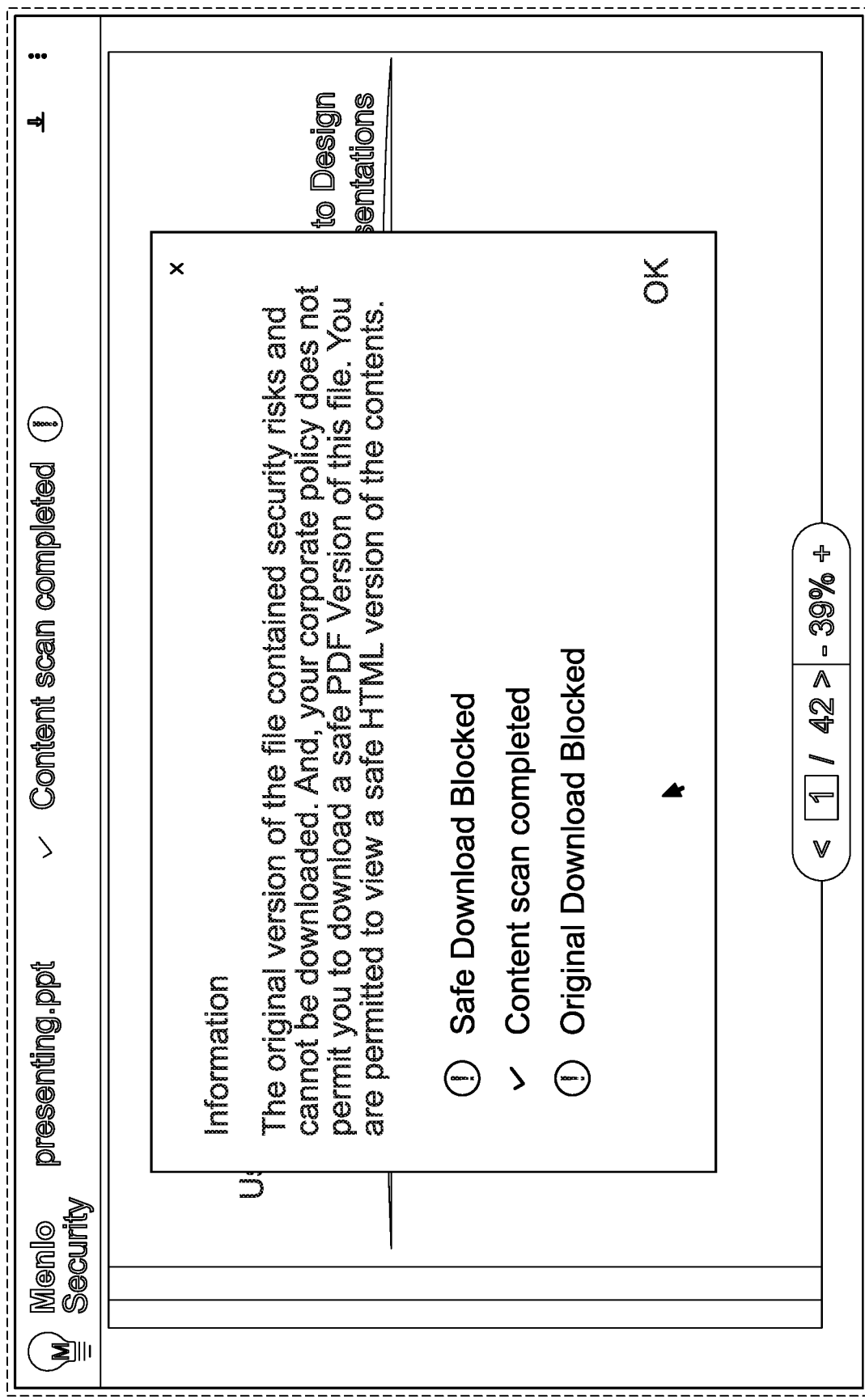
FIG. 33B illustrates an example of a dialog box.

Other types of rules can also be specified, such as allowing a user to view the contents of an attachment, but preventing the user from downloading the attachment. In this scenario, when Dave clicks on an attachment link, the attachment is scanned for security issues by system 2502 (as applicable) and transformed using document isolation into safe HTML that he can view from his browser (but not download) as shown in FIG. 33A. Similar rules can be specified for providing controls on uploads, password protection, etc. (described in more detail above). Dave can learn more about file access by clicking on region 3302, which will result in a dialog box such as is shown in FIG. 33B appearing. In this particular example, he is unable to download the original file (because system 2502 was unable to confirm it as safe), but is also unable to download a safe PDF version of the file (because policy prevents it).

Traditional console-based tools, such as ssh, can also be supported using techniques described herein. As one example, ACME Bank can deploy an instance of Shell In A Box (a web-based terminal emulator) that has a built-in web server that runs as a web-based ssh client on a specified port without the need of any additional browser plugins. If Alice or Dave needs to use ssh within the ACME Bank corporate environment, they can be required (e.g., through policies specified on system 2502) to use the web-based version of ssh as a browser-isolated application via portal 3000.

Figure 34A:
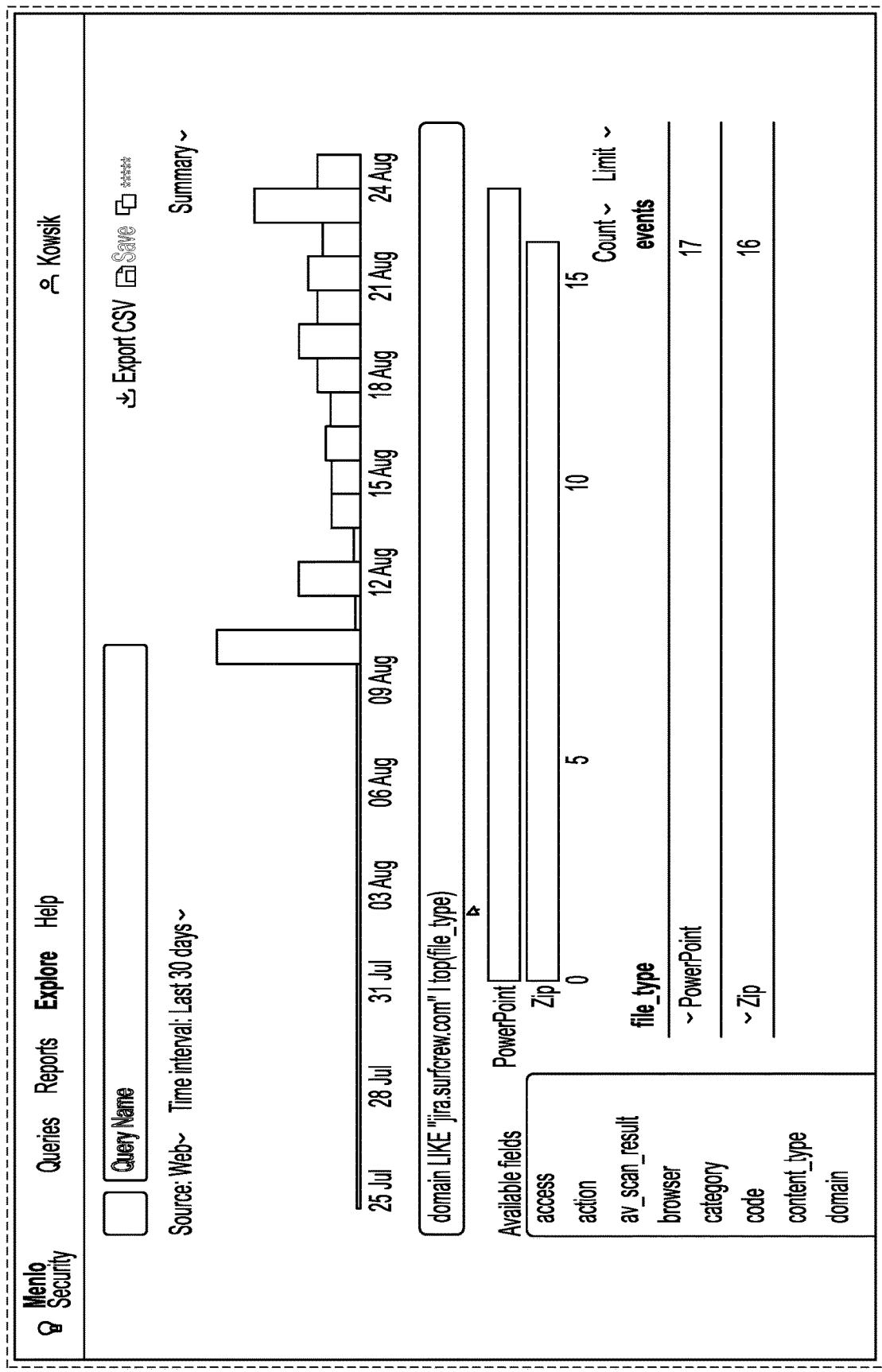
FIGS. 34A-34C illustrate examples of statistical/analytics reporting interfaces.
Figure 34B:
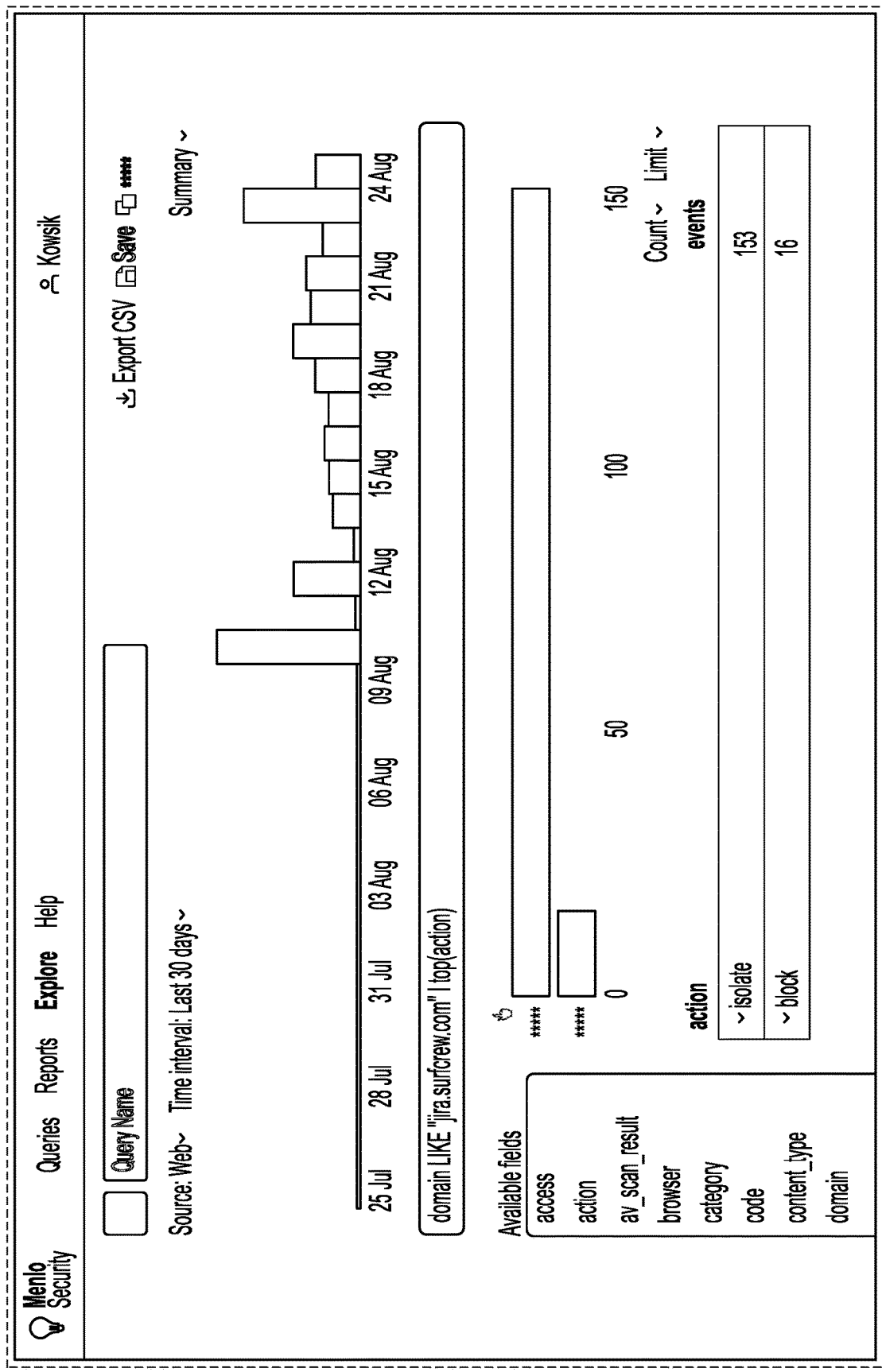
Figure 34C:
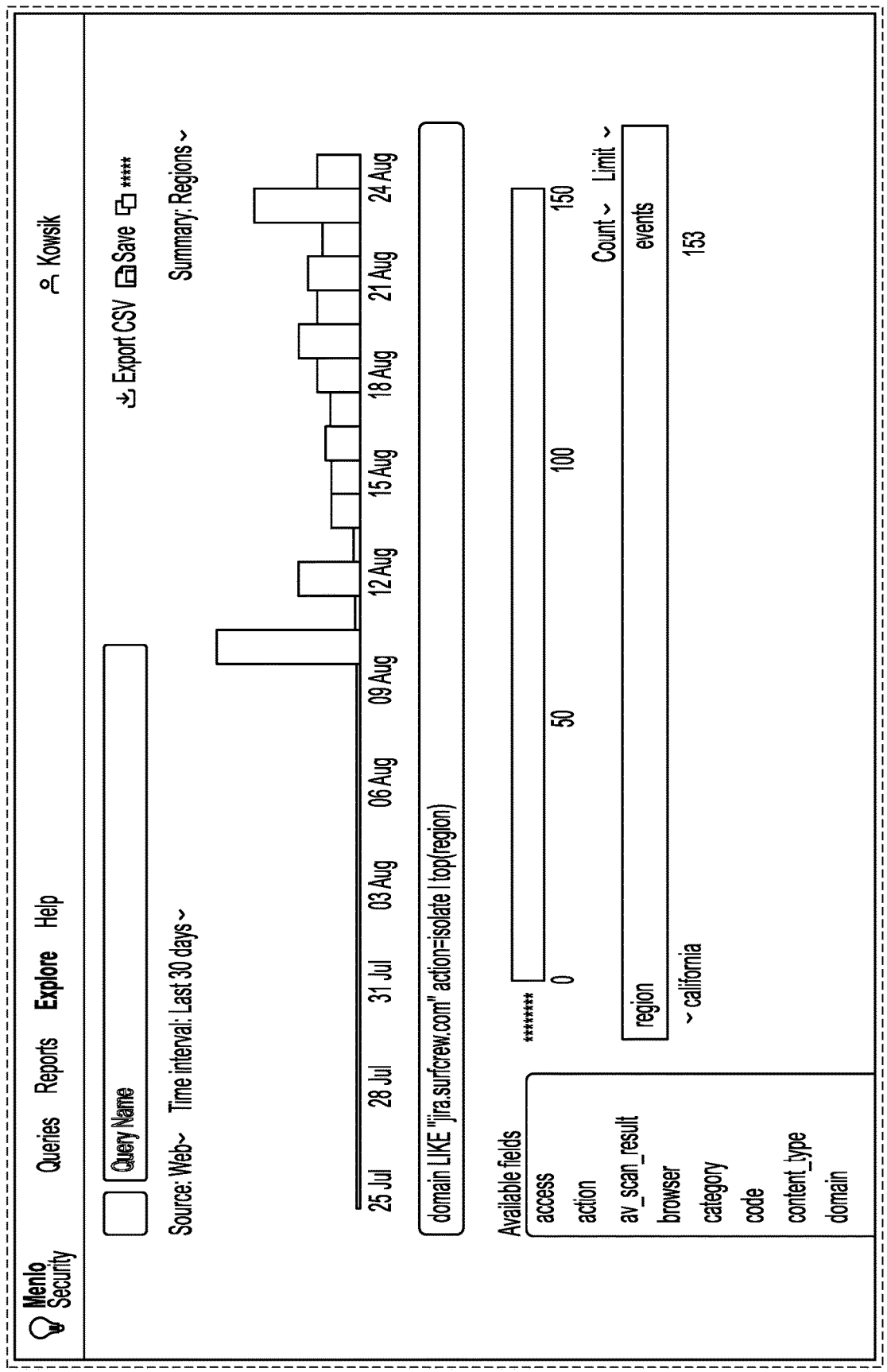

In various embodiments, access to applications is logged by system 2502 with full context. Administrators can obtain visibility into information such as the different type of file types users attempt to fetch (FIG. 34A), types of actions taken (34B), and the location from which users are accessing applications (34C).

Figure 35:
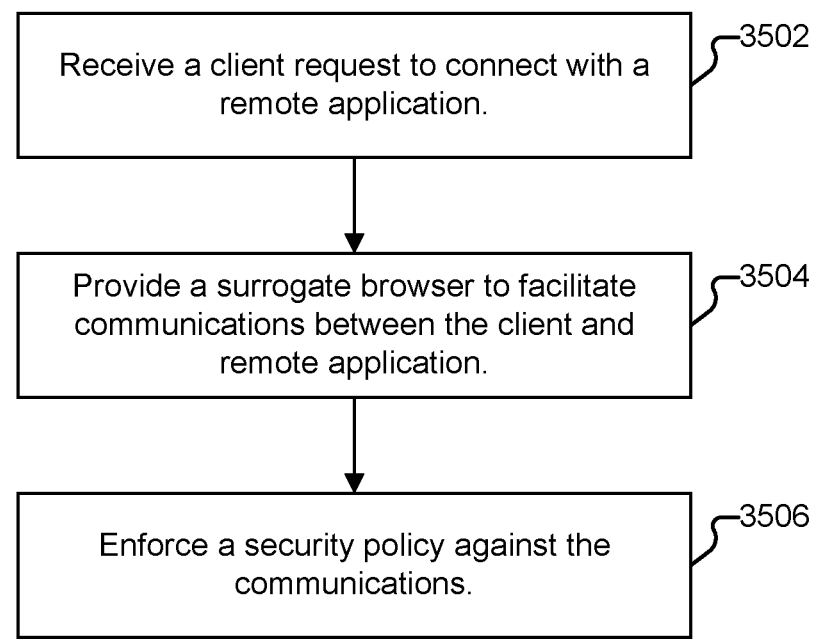
FIG. 35 illustrates an embodiment of a process for protecting web applications from untrusted endpoints using remote browser isolation.

FIG. 35 illustrates an embodiment of a process for protecting web applications from untrusted endpoints using remote browser isolation. In various embodiments, process 3500 is performed by system 2502. The process begins at 3502 when a browser isolation system receives a request from a client browser executing on a client device to connect with a remote application. As one example, at 3502, Bob uses the web browser on his daughter's tablet 2506 to access ACME Bank's portal 3000 and clicks on link 3002. At 3504, a surrogate browser is provided to facilitate communications between the client browser and the remote application (e.g., as described variously above, such as in conjunction with FIG. 7). Finally, at 3506, a security policy is enforced against the communications. As one example, when Bob clicks on link 3102, a policy preventing him from downloading Jira attachments will be enforced. As mentioned above, the Jira application does not natively provide the ability to prevent Bob from downloading attachments. This functionality is provided due to the infrastructure of system 2502.

While techniques in this section have generally been described in the context of internal applications, the same techniques can be applied, e.g., to make a catalog of public applications (e.g., pastebin.com or facebook.com) so that system 2502 can be used to enforce applicable policies when ACME Bank employees access those applications (e.g., preventing file uploads, performing security checks on file downloads, preventing the submission of text by blocking text-field POSTs, etc.). As applicable, a reverse proxy can be used so that if, e.g., Alice types "www.facebook.com" into her browser, her traffic will be routed to system 2502 which will facilitate a connection for her to www.facebook.com using a surrogate browser. In various embodiments, ACME Bank can use the techniques described herein to provide a secure way for its customers to perform online banking transactions, even where their customers endpoints are compromised. For example, ACME Bank can make a banking application available at https://safe.menlosecurity.com/onlinebanking.acmebank.com, and set rules that allow customers to access the application (e.g., using a username/password). Attempts to perform DOM manipulations or other attacks against the banking application will not be possible because the customer's interactions with the banking application will be performed using a surrogate browser provided by system 2502.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        receive at a browser isolation system, a request from a client browser executing on a client device to connect with a remote application, wherein access by the client device to the remote application requires that the client device connect with the remote application via a private network; and
        provide, by the browser isolation system, a surrogate browser to facilitate communications between the client browser and the remote application through the private network and in accordance with enforcement of a security policy, wherein the browser isolation system is configured to facilitate the communications at least in part by:
            receiving a first data transmission from the client device and determining, based on the security policy, whether to transmit the first data transmission, on behalf of the client device, to the remote application; and
            receiving a second data transmission from the remote application and determining, based on the security policy, whether to transmit the second data transmission, on behalf of the remote application, to the client device;
        wherein:
            the remote application provides a set of remote site features;
            enforcing the security policy includes preventing, by the browser isolation system, the client device from using a first feature included in the set of remote site features while allowing the client device to use a second feature included in the set of remote site features; and
            preventing the client device from using the first feature includes blocking transmission of at least one of: (1) the first data transmission or (2) the second data transmission; and
    a memory coupled to the processor and configured to provide the processor with instructions.

2. The system of claim 1 wherein enforcing the security policy includes preventing the client browser from performing a text-field POST to the remote application.

3. The system of claim 1 wherein enforcing the security policy includes preventing a file upload by the client device to the remote application.

4. The system of claim 1 wherein enforcing the security policy includes preventing a file download by the client device from the remote application.

5. The system of claim 1 wherein enforcing the security policy includes converting a file attachment, by the browser isolation system, from a first format to a second format.

6. The system of claim 1 wherein the processor is further configured to prompt a user to provide a credential associated with a file the user is attempting to upload.

7. The system of claim 1 wherein the processor is further configured to obfuscate URLs provided to the client browser.

8. The system of claim 1 wherein the browser isolation system is further configured to provide the client device with a thin client that executes in the client browser.

9. The system of claim 1 wherein the remote application comprises an ssh web application.

10. The system of claim 1 wherein the private network is within an enterprise network and wherein the client device is not connected to the enterprise network.

11. The system of claim 5 wherein the first format is not HTML and the second format is HTML.

12. The system of claim 6 wherein the processor is further configured to decrypt the file using the credential.

13. A method, comprising:
    receiving at a browser isolation system, a request from a client browser executing on a client device to connect with a remote application, wherein access by the client device to the remote application requires that the client device connect with the remote application via a private network; and
    providing, by the browser isolation system, a surrogate browser to facilitate communications between the client browser and the remote application through the private network and in accordance with enforcement of a security policy, wherein the browser isolation system is configured to facilitate the communications at least in part by:
        receiving a first data transmission from the client device and determining, based on the security policy, whether to transmit the first data transmission, on behalf of the client device, to the remote application; and
        receiving a second data transmission from the remote application and determining, based on the security policy, whether to transmit the second data transmission, on behalf of the remote application, to the client device;
    wherein:
        the remote application provides a set of remote site features;
        enforcing the security policy includes preventing, by the browser isolation system, the client device from using a first feature included in the set of remote site features while allowing the client device to use a second feature included in the set of remote site features; and
        preventing the client device from using the first feature includes blocking transmission of at least one of: (1) the first data transmission or (2) the second data transmission.

14. The method of claim 13 wherein enforcing the security policy includes preventing the client browser from performing a text-field POST to the remote application.

15. The method of claim 13 wherein enforcing the security policy includes preventing a file upload by the client device to the remote application.

16. The method of claim 13 wherein enforcing the security policy includes preventing a file download by the client device from the remote application.

17. The method of claim 13 wherein enforcing the security policy includes converting a file attachment, by the browser isolation system, from a first format to a second format.

18. The method of claim 13 further comprising prompting a user to provide a credential associated with a file the user is attempting to upload.

19. The method of claim 13 further comprising obfuscating URLs provided to the client browser.

20. The method of claim 13 wherein the browser isolation system is further configured to provide the client device with a thin client that executes in the client browser.

21. The method of claim 13 wherein the remote application comprises an ssh web application.

22. The method of claim 13 wherein the private network is within an enterprise network and wherein the client device is not connected to the enterprise network.

23. The method of claim 17 wherein the first format is not HTML and the second format is HTML.

24. The method of claim 18 further comprising decrypting the file using the credential.

25. A computer program product embodied in a non-transitory computer readable medium and comprising computer instructions for:
receiving at a browser isolation system, a request from a client browser executing on a client device to connect with a remote application, wherein access by the client device to the remote application requires that the client device connect with the remote application via a private network; and
providing, by the browser isolation system, a surrogate browser to facilitate communications between the client browser and the remote application through the private network and in accordance with enforcement of a security policy, wherein the browser isolation system is configured to facilitate the communications at least in part by:
receiving a first data transmission from the client device and determining based on the security policy, whether to transmit the first data transmission, on behalf of the client device, to the remote application; and
receiving a second data transmission from the remote application and determining, based on the security policy, whether to transmit the second data transmission, on behalf of the remote application, to the client device;
wherein:
the remote application provides a set of remote site features;
enforcing the security policy includes preventing, by the browser isolation system, the client device from using a first feature included in the set of remote site features while allowing the client device to use a second feature included in the set of remote site features; and
preventing the client device from using the first feature includes blocking transmission of at least one of: (1) the first data transmission or (2) the second data transmission.

\* \* \* \* \*

UNITED STATES PATENT AND TRADEMARK OFFICE
CERTIFICATE OF CORRECTION

| | | |
|---|---|---|
| PATENT NO. | : 11,245,731 B1 | Page 1 of 1 |
| APPLICATION NO. | : 17/081941 | |
| DATED | : February 8, 2022 | |
| INVENTOR(S) | : Kowsik Guruswamy et al. | |

It is certified that error appears in the above-identified patent and that said Letters Patent is hereby corrected as shown below:

In the Drawings

In sheet(s) 13 of 39, figure 13, after "Enter", delete "users(s)" and insert --user(s)--, therefor.

In sheet(s) 13 of 39, figure 13, after "Enter", delete "groups(s)" and insert --group(s)--, therefor.

In sheet(s) 20 of 39, figure 20, after "Destination:", delete "dlpest.com" and insert --dlptest.com--, therefor.

In the Specification

In Column 7, Line(s) 49, after "point", delete "to".

In Column 15, Line(s) 62, delete "page url" and insert --page_url--, therefor.

In Column 15, Line(s) 64, delete "file url" and insert --file_url--, therefor.

In Column 21, Line(s) 5, delete "https://safe.menlosecurity.com/acmebank.com" and insert --https://safe.menlosecurity.com/acmebank.com--, therefor.

In the Claims

In Column 26, Line(s) 13, Claim 25, after "determining", insert --,--.

Signed and Sealed this
Third Day of June, 2025

Coke Morgan Stewart
*Acting Director of the United States Patent and Trademark Office*